(12) United States Patent
Shin

(10) Patent No.: US 10,405,049 B2
(45) Date of Patent: Sep. 3, 2019

(54) DIGITAL DEVICE AND METHOD OF PROCESSING DATA USING THE SAME

(71) Applicant: LG ELECTRONICS INC., Seoul (KR)

(72) Inventor: Jeongbae Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 134 days.

(21) Appl. No.: 15/288,094

(22) Filed: Oct. 7, 2016

(65) Prior Publication Data

US 2017/0105046 A1    Apr. 13, 2017

(30) Foreign Application Priority Data

Oct. 8, 2015    (KR) .................. 10-2015-0141574

(51) Int. Cl.
  *H04N 21/478*    (2011.01)
  *H04N 5/44*    (2011.01)
  (Continued)

(52) U.S. Cl.
  CPC ........... *H04N 21/478* (2013.01); *G05B 15/02* (2013.01); *G05B 19/042* (2013.01);
  (Continued)

(58) Field of Classification Search
  CPC .. H04N 5/4403; H04N 5/445; H04N 5/44513; H04N 5/44543; H04N 21/42207;
  (Continued)

(56) References Cited

U.S. PATENT DOCUMENTS

| 6,967,695 B2* | 11/2005 | Hoshino | G08C 23/04 |
| | | | 348/734 |
| 7,483,834 B2* | 1/2009 | Naimpally | G10L 13/00 |
| | | | 704/258 |

(Continued)

FOREIGN PATENT DOCUMENTS

| EP | 2894435 A1 | 7/2015 |
| WO | WO 2014/124353 A1 | 8/2014 |

*Primary Examiner* — Crystal J Barnes-Bullock
(74) *Attorney, Agent, or Firm* — Birch, Stewart, Kolasch & Birch, LLP

(57) ABSTRACT

The present specification discloses a digital device and a method of processing data in the digital device. In this case, a smart adaptive alarm system including at least one controlling device and at least one target device includes a server configured to store weather information, identification information of the controlling device, and sensing information of a sensor adjacent to the target device, a controlling device configured to receive a service guide display request, to receive the stored weather information, the identification information of the controlling device, and the sensing information of the sensor adjacent to the target device from the server, to generate and display a service guide based on the received information, to generate a control command for controlling the target device according to a configuration set from the displayed service guide, and to display a control result of the target device by returning the result; and a target device configured to be controlled according to the control command and to return the control result.

16 Claims, 25 Drawing Sheets

(51) Int. Cl.

| | | |
|---|---|---|
| *H04N 5/445* | (2011.01) | |
| *H04N 21/422* | (2011.01) | |
| *H04N 21/45* | (2011.01) | |
| *H04N 21/462* | (2011.01) | |
| *H04N 21/442* | (2011.01) | |
| *G06F 3/0482* | (2013.01) | |
| *H04L 12/28* | (2006.01) | |
| *H04H 60/27* | (2008.01) | |
| *G05D 23/19* | (2006.01) | |
| *H04H 60/72* | (2008.01) | |
| *G05B 19/042* | (2006.01) | |
| *G05B 15/02* | (2006.01) | |
| *H04N 21/482* | (2011.01) | |
| *G08B 21/24* | (2006.01) | |
| *G08B 25/08* | (2006.01) | |
| *G06Q 50/06* | (2012.01) | |
| *H04N 21/488* | (2011.01) | |
| *G06Q 50/10* | (2012.01) | |

(52) U.S. Cl.
CPC ....... *G05D 23/1931* (2013.01); *G06F 3/0482* (2013.01); *G06Q 50/06* (2013.01); *G08B 21/24* (2013.01); *G08B 25/08* (2013.01); *H04H 60/27* (2013.01); *H04H 60/72* (2013.01); *H04L 12/2816* (2013.01); *H04N 5/4403* (2013.01); *H04N 5/44513* (2013.01); *H04N 5/44543* (2013.01); *H04N 21/42207* (2013.01); *H04N 21/42209* (2013.01); *H04N 21/44222* (2013.01); *H04N 21/4532* (2013.01); *H04N 21/4622* (2013.01); *H04N 21/482* (2013.01); *H04N 21/488* (2013.01); *G05B 2219/2614* (2013.01); *G05B 2219/2642* (2013.01); *G06Q 50/10* (2013.01)

(58) Field of Classification Search
CPC ....... H04N 21/42209; H04N 21/44222; H04N 21/4532; H04N 21/4622; H04N 21/47; H04N 21/478; H04N 21/482; H04N 21/485; H04N 21/488; H04L 12/2816; G06F 3/0482; G06F 19/00; G05B 15/02; G05B 19/04; G05B 19/042; G05B 2219/2614; G05B 2219/2642; G05D 23/1931; H04H 60/27; H04H 60/72
See application file for complete search history.

(56) References Cited

U.S. PATENT DOCUMENTS

| | | | | |
|---|---|---|---|---|
| 7,823,176 | B2* | 10/2010 | Kitagawa | H04N 5/44543 725/39 |
| 8,505,049 | B2* | 8/2013 | Ellis | H04N 5/44543 725/34 |
| 8,544,049 | B2* | 9/2013 | Kamimaki | H04N 7/163 725/105 |
| 8,566,874 | B2* | 10/2013 | Roberts | G06F 3/0482 725/43 |
| 8,819,747 | B2* | 8/2014 | Kamimaki | H04N 7/163 725/80 |
| 8,973,040 | B2* | 3/2015 | Roberts | G06F 3/0482 715/789 |
| 9,116,601 | B2* | 8/2015 | Yang | G06F 3/0481 |
| 9,477,378 | B2* | 10/2016 | Yang | G06F 3/0481 |
| 9,948,477 | B2* | 4/2018 | Marten | G05B 15/02 |
| 2004/0215388 | A1 | 10/2004 | Takenaka | |
| 2005/0015803 | A1* | 1/2005 | Macrae | H04N 5/44543 725/41 |
| 2006/0064724 | A1* | 3/2006 | Kwon | H04H 60/27 725/52 |
| 2007/0043687 | A1 | 2/2007 | Bodart et al. | |
| 2008/0147205 | A1 | 6/2008 | Ollis et al. | |
| 2010/0154000 | A1* | 6/2010 | Macrae | H04N 5/44543 725/41 |
| 2010/0191826 | A1* | 7/2010 | Tsurukiri | G06F 17/30017 709/217 |
| 2011/0018818 | A1 | 1/2011 | Iwano | |
| 2011/0030016 | A1 | 2/2011 | Pino, Jr. et al. | |
| 2014/0229018 | A1 | 8/2014 | Steinberg | |
| 2014/0266669 | A1 | 9/2014 | Fadell et al. | |
| 2015/0019115 | A1 | 1/2015 | Kim | |
| 2015/0160797 | A1 | 6/2015 | Shearer et al. | |
| 2015/0193127 | A1 | 7/2015 | Chai et al. | |
| 2017/0108235 | A1* | 4/2017 | Guan | G05B 19/04 |

* cited by examiner

FIG. 3
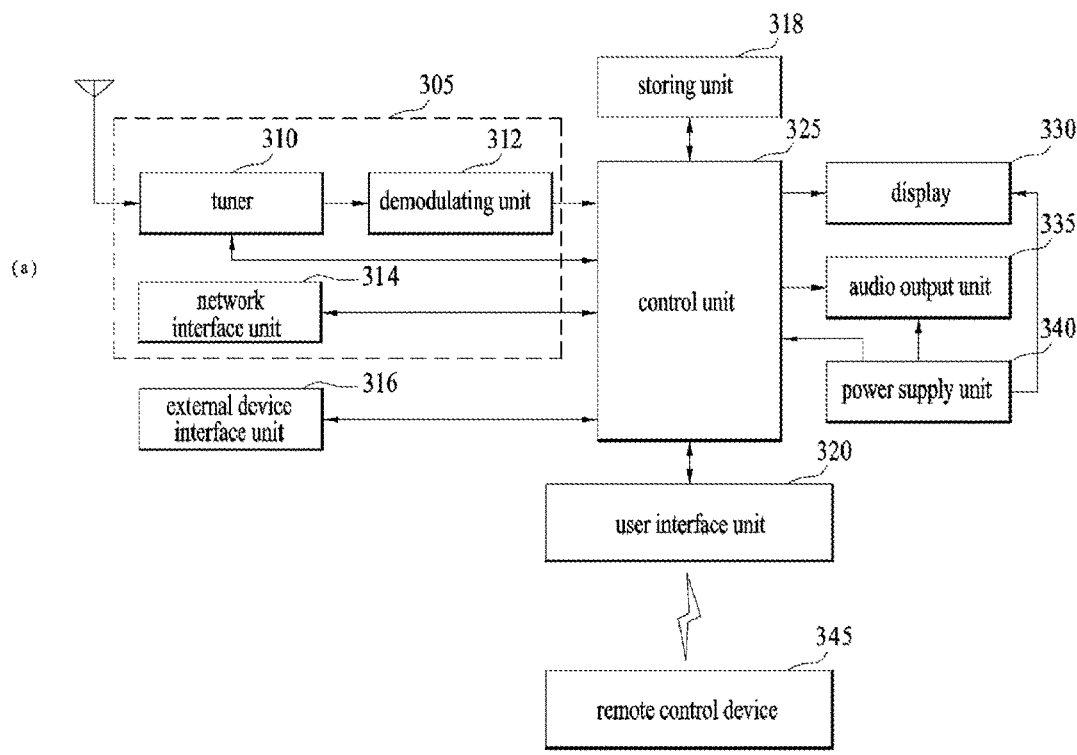
(a)
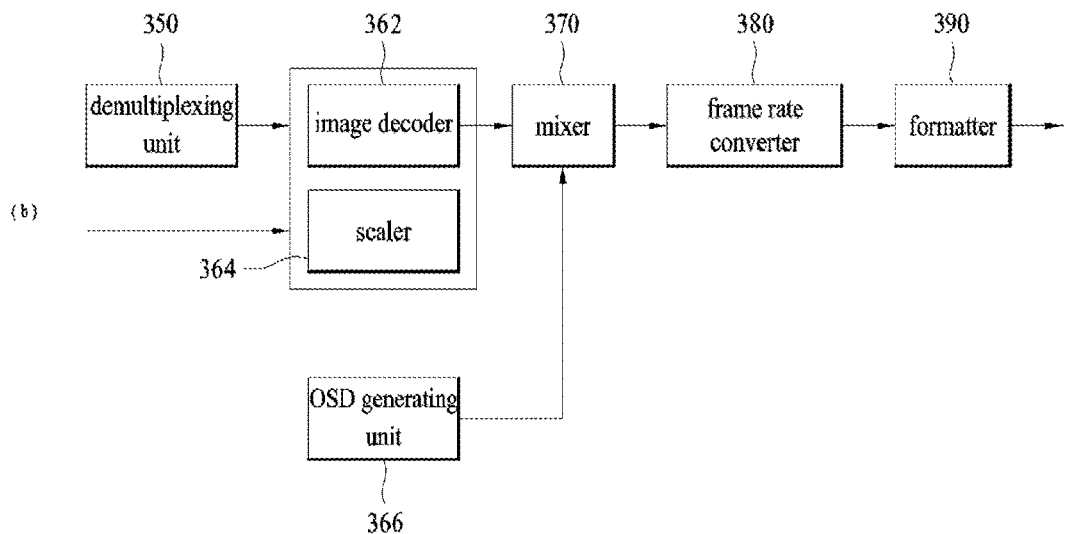
(b)

FIG. 9

Home / Room1 — 910    920

| | June 1 (Mon) | June 2 (Tue) | June 3 (Wed) | June 4 (Thu) | June 5 (Fri) | June 6 (Sat) | June 7 (Sun) |
|---|---|---|---|---|---|---|---|
| Temperature | 21℃ 28℃ | 20℃ 27℃ | | | | | |
| Humidity | 30% | 60% | | | | | |
| Precipitation (snow/rain/hail) | 10% | 40% | | | | | |
| Fine dust | 100 | 40 | | | | | |
| Special weather report | Yellow-dust warning | UV ray warning | | | | | |
| add | | | | | | | |

FIG. 10

June 1 — 1010

| | AM 12~3 | AM 3~6 | AM 6~9 | AM 9~12 | PM 12~3 | PM 3~6 | PM 6~9 |
|---|---|---|---|---|---|---|---|
| Temperature | 21℃ 18℃ | 22℃ 17℃ | | | | | |
| Humidity | 30% 70% | 60% 100% | | | | | |
| Precipitation (snow/rain/hail) | 10% | 20% 100% | | | | | |
| Fine dust | 60 40 | 70 30 | | | | | |
| Special weather report | none | UV ray warning Localized heavy rain | | | | | |
| add | | | | | | | |

Sensor value is displayed together

FIG. 11

|  | June 1 (Mon) | June 2 (Tue) | June 3 (Wed) | June 4 (Thu) | June 5 (Fri) | June 6 (Sat) | June 7 (Sun) |
|---|---|---|---|---|---|---|---|
| 10-12 a.m. | Sunny, 28℃ yellow-dust warning | Sunny, 33℃ UV ray warning | Sunny, 31℃ | Shower, 29℃ localized heavy rain | Cloudy, 25℃ | Rainy (10mm), 22℃ | Cloud, 18℃ |
| 12-14 p.m. | Sunny, 31℃ | Cloudy, 25℃ | Sunny, 31℃ | Cloudy, 25℃ | Sunny, 28℃ | Cloudy, 23℃ | Cloudy, 22℃ |
| 14-16 p.m. | Sunny, 31℃ | Cloudy, 27℃ | Sunny, 33℃ | Sunny, 25℃ | Sunny, 30℃ | Cloudy, 23℃ | Cloudy, 24℃ |
| 16-18 p.m. | Cloudy, 25℃ | Cloudy, 26℃ | Sunny, 30℃ | Sunny, 31℃ | Sunny, 30℃ | Cloudy, 23℃ | Cloudy, 24℃ |
| 20-22 p.m. | Cloudy, 25℃ | Cloudy, 25℃ | Cloudy, 25℃ | Sunny, 31℃ | Sunny, 28℃ | Sunny, 26℃ | Cloudy, 23℃ |
| 22-24 p.m. | Cloudy, 25℃ | Cloudy, 23℃ | Cloudy, 22℃ | Cloudy, 25℃ | Sunny, 25℃ | Sunny, 27℃ | Sunny, 25℃ |

FIG. 14

| | June 1 (Mon) | June 2 (Tue) | June 3 (Wed) | June 4 (Thu) | June 5 (Fri) | June 6 (Sat) | June 7 (Sun) |
|---|---|---|---|---|---|---|---|
| Weather | Sunny, 28℃ yellow-dust warning | Sunny, 30℃ Ozone warning | Cloudy, 25℃ | Shower, 22℃ localized heavy rain | Sunny, 33℃ UV ray warning | Rainy (10mm), 15℃ | Cloud, 29℃ |
| Air conditioner / air cleaner | Air conditioner on | [Air conditioning] 26℃ (1-3 p.m.) | - | [dehumidification] | [Air conditioning] 26℃ (1-3 p.m.) | [dehumidification] | - |
| LED light | On (6 o'clock) Alarm interworking (on) | On (6 o'clock) Alarm interworking (on) | On (6 o'clock) Alarm interworking (on) | On (6 o'clock) Alarm interworking (on) | On (6 o'clock) Alarm interworking (on) | On (6 o'clock) Alarm interworking (on) | On (6 o'clock) Alarm interworking (on) |
| Washing machine | off | 1-3 p.m. High laundry index | off | Off | 2-4 p.m., On High laundry index | off | 1-4 p.m, On Middle laundry index |
| Refrigerator | middle | strong | weak | weak | strong | weak | middle |
| boiler | off | off | off | weak, 5-6 p.m. | off | middle | off |

1410 (Weather row)
1420 (Device rows)

FIG. 15

|  | June 1 (Mon) | June 2 (Tue) | June 3 (Wed) | June 4 (Thu) | June 5 (Fri) | June 6 (Sat) | June 7 (Sun) |
|---|---|---|---|---|---|---|---|
| 10-12 a.m. | Sunny, 28℃ yellow-dust warning | Sunny, 33℃ UV ray warning | Sunny, 31℃ | Shower, 29℃ localized heavy rain | Cloudy, 25℃ | Rainy (10mm), 22℃ | Cloud, 18℃ |
| 12-14 p.m. | Sunny, 31℃ | Cloudy, 25℃ | Cloudy, 25℃ | Cloudy, 25℃ | Cloudy, 25℃ | Cloudy, 25℃ | Cloudy, 25℃ |
| 14-16 p.m. | Sunny, 31℃ | Cloudy, 25℃ | Cloudy, 25℃ | Cloudy, 25℃ | Cloudy, 25℃ | Cloudy, 25℃ | Cloudy, 25℃ |
| 16-18 p.m. | Cloudy, 25℃ | Cloudy, 25℃ | Cloudy, 25℃ | Cloudy, 25℃ | Cloudy, 25℃ | Cloudy, 25℃ | Cloudy, 25℃ |
| 20-22 p.m. | Cloudy, 25℃ | Cloudy, 25℃ | Cloudy, 25℃ | Cloudy, 25℃ | Cloudy, 25℃ | Cloudy, 25℃ | Cloudy, 25℃ |
| 22-24 p.m. | Cloudy, 25℃ | Cloudy, 25℃ | Cloudy, 25℃ | Cloudy, 25℃ | Cloudy, 25℃ | Cloudy, 25℃ | Cloudy, 25℃ |

| | June 1 (Mon) | June 2 (Tue) | June 3 (Wed) | June 4 (Thu) | June 5 (Fri) | June 6 (Sat) | June 7 (Sun) |
|---|---|---|---|---|---|---|---|
| | Sunny, 28℃ yellow-dust warning | Sunny | | | | | Cloud, 18℃ |
| | | Device | On/Off | Recommendation | Automatic/manual | Note | |
| 10-12 a.m. | Sunny, 31℃ | Air conditioner / air cleaner | On | [Air conditioning] 26℃ | Automatic | Power consumption is high. 1 hour off | Cloudy, 25℃ |
| 12-14 p.m. | Sunny, 31℃ | LED light [Room 1] [Room 2] | Off | Off | Automatic | On at 6 P.M. according to schedule change | Cloudy, 25℃ |
| 14-16 p.m. | Cloudy, 25℃ | Washing machine [Off] | Off | High laundry index Laundry reservation | manual | | Cloudy, 25℃ |
| 16-18 p.m. | Cloudy, 25℃ | Refrigerator [fridge-middle] [fridge-strong] | | fridge-strong | manual | Expiration date of fruit is arriving | Cloudy, 25℃ |
| 20-22 p.m. | Cloudy, 25℃ | Push to automatically register device | | | | | Cloudy, 25℃ |
| 22-24 p.m. | Cloudy, 25℃ | Cloudy, 25℃ | Cloudy, 25℃ | Cloudy, 25℃ | Cloudy, 25℃ | Cloudy, 25℃ | Cloudy, 25℃ |

| June 1 (Mon) | 10 - 12 a.m. | 12 - 14 p.m. | 14 - 16 p.m. | 16 - 18 p.m. | 18 - 20 p.m. [sunset] | 20 - 22 p.m. | 22 - 24 p.m. |
|---|---|---|---|---|---|---|---|
| Weather [Seocho-dong] | Sunny, 28℃ yellow-dust warning | Sunny, 33℃ UV ray warning | Sunny, 31℃ | Shower, 29℃ localized heavy rain | Cloudy, 25℃ | Rainy (10mm), 22℃ | Cloudy, 18℃ |
| Air conditioner / air cleaner [On] | Air cleaning [On] | [Air conditioning] 26℃ | [Air conditioning] 26℃ | [dehumidification] | [Air conditioning] 26℃ (1-3 p.m.) | [dehumidification] | - |
| LED light [Room 1] [Room 2] | Off | Off | Off | Off | On | On (Room 1) Off (Room 2) | Off reservation (All Room) (23:30 p.m.) |
| Washing machine [Off] | Low laundry index | High laundry index reservation- O | High laundry index reservation- O | Laundry [x] | Laundry [x] | Laundry [x] | Low laundry index |
| Refrigerator [fridge – middle] [freezer – strong] | - | fridge – strong | fridge – middle | fridge – middle freezer – middle | fridge – weak freezer – weak | - | - |
| Push to automatically register device | | | | | | | |

FIG. 18

| | June 1 (Mon) | June 2 (Tue) | June 3 (Wed) | June 4 (Thu) | June 5 (Fri) | June 6 (Sat) | June 7 (Sun) |
|---|---|---|---|---|---|---|---|
| Weather | Sunny, 28℃ yellow-dust warning | Sunny, 30℃ Ozone warning | Cloudy, 25℃ | Shower, 22℃ localized heavy rain | Sunny, 33℃ UV ray warning | Rainy (10mm), 15℃ | Cloud, 29℃ |
| Air conditioner / air cleaner | Air conditioner on | [Air conditioning] 26℃ (1-3 p.m.) | - | [dehumidification] | [Air conditioning] 26℃ (1-3 p.m.) | [dehumidification] | - |
| LED light | On (6 o'clock) Alarm interworking (on) | On (6 o'clock) Alarm interworking (on) | On (6 o'clock) Alarm interworking (on) | On (6 o'clock) Alarm interworking (on) | On (6 o'clock) Alarm interworking (on) | On (6 o'clock) Alarm interworking (on) | On (6 o'clock) Alarm interworking (on) |
| Washing machine | off | 1-3 p.m. High laundry index | off | Off | 2-4 p.m. On High laundry index | off | 1-4 p.m., On Middle laundry index |
| Refrigerator | middle | strong | weak | weak | strong | weak | middle |
| boiler | off | off | off | weak, 5-6 p.m. | off | middle | off |

| June 1 (Mon) | 10 - 12 a.m. | 12 - 14 p.m. | 14 - 16 p.m. | 16 - 18 p.m. | 18 - 20 p.m. [sunset] | 20 - 22 p.m. | 22 - 24 p.m. |
|---|---|---|---|---|---|---|---|
| Weather [Seocho-dong] | Sunny, 28℃ yellow-dust warning | Sunny, 33℃ UV ray warning | Sunny, 31℃ | Shower, 29℃ localized heavy rain | Cloudy, 25℃ | Rainy (10mm), 22℃ | Cloudy, 18℃ |
| Air conditioner / air cleaner [On] | Air cleaning [On] | [Air conditioning] 26℃ | [Air conditioning] 26℃ | [dehumidification] | [Air conditioning] 26℃ (1-3 p.m.) | [dehumidification] | - |
| LED light [Room 1] [Room 2] | Off | Off | Off | Off | On | On (Room 1) Off (Room 2) | Off reservation (All Room) (23:30 p.m.) |
| Washing machine [Off] | Low laundry index | High laundry index reservation- O | High laundry index reservation- O | Laundry [x] | Laundry [x] | Laundry [x] | Low laundry index |
| Refrigerator [fridge – middle] [freezer – strong] | - | fridge – strong | fridge – middle | fridge – middle freezer – middle | fridge – weak freezer – weak | - | - |
| Push to automatically register device | | | | | | | |

FIG. 20

| | June 1 (Mon) | June 2 (Tue) | June 3 (Wed) | June 4 (Thu) | June 5 (Fri) | June 6 (Sat) | June 7 (Sun) |
|---|---|---|---|---|---|---|---|
| Weather | Sunny, 28℃ yellow-dust warning | Sunny, 30℃ Ozone warning | Cloudy, 25℃ | Shower, 22℃ localized heavy rain | Sunny, 33℃ UV ray warning | Rainy (10mm), 15℃ | Cloud, 29℃ |
| Air conditioner / air cleaner | Air conditioner on | [Air conditioning] 26℃ (1-3 p.m.) | - | [dehumidification] | [Air conditioning] 26℃ (1-3 p.m.) | [dehumidification] | - |
| LED light | On (6 o'clock) Alarm interworking (on) | On (6 o'clock) Alarm interworking (on) | On (6 o'clock) Alarm interworking (on) | On (6 o'clock) Alarm interworking (on) | On (6 o'clock) Alarm interworking (on) | On (6 o'clock) Alarm interworking (on) | On (6 o'clock) Alarm interworking (on) |
| Washing machine | off | 1-3 p.m. High laundry index | off | Off | 2-4 p.m, On High laundry index | off | 1-4 p.m, On Middle laundry index |
| Refrigerator | middle | strong | weak | weak | strong | weak | middle |
| boiler | off | off | off | weak, 5-6 p.m. | off | middle | off |

|  | June 1 (Mon) | 12-14 p.m. | 14-16 p.m. | June 4 (Thu) | June 5 (Fri) | June 6 (Sat) | June 7 (Sun) |
|---|---|---|---|---|---|---|---|
| Weather | Sunny, 28℃ yellow-dust warning | Sunny, 33℃ UV ray warning | Sunny, 31℃ | Sunny, 30℃ UV ray warning | Cloudy, 25℃ | Shower, 22℃ localized heavy rain | Sunny, 33℃ UV ray warning |
| Air conditioner / air cleaner | Air cleaning on | [Air conditioning] 26℃ | [Air conditioning] 26℃ | [Air conditioning] 26℃ (1-3 p.m.) | - | [dehumidification] | [Air conditioning] 26℃ (1-3 p.m.) |
| LED light | On (6 o'clock) Air conditioning(on) | Off | Off | On (6 o'clock) Alarm interworking (on) | On (6 o'clock) Alarm interworking (on) | On (6 o'clock) Alarm interworking (on) | On (6 o'clock) Alarm interworking (on) |
| Washing machine | Off | High laundry index, reservation | High laundry index, reservation | High laundry index | Off | Off | 2-4 p.m, On Middle laundry index |
| Refrigerator | middle | Fridge-strong | Fridge-strong | strong | weak | weak | strong |
| boiler | Off | | | Off | Off | weak, 5-6 p.m. | Off |

| June 1 (Mon) | 10 - 12 a.m. | 12 - 14 p.m. | 14 - 16 p.m. | 16 - 18 p.m. | 18 - 20 p.m. [sunset] | 20 - 22 p.m. | 22 - 24 p.m. |
|---|---|---|---|---|---|---|---|
| Weather [Seocho-dong] | yell | | | | | | Cloudy, 18°C |
| Air conditioner / air cleaner [On] | | | | | | | - |
| LED light [Room 1] [Room 2] | | | | | | | Off reservation (All Room) (23:30 p.m.) |
| Washing machine [Off] | | | | | | | Low laundry index |
| Refrigerator [fridge – middle] [freezer – strong] | | | | | | | - |
| Push to automatically register device | | | | | | | |

Satellite picture (cloud, etc.)

Detail data of EWC specific time (e.g., weather forecast of the national weather service, weather information of data broadcasting)

Reservation item – bedroom (room 1) 24h bed time, child (room 2) is at home at 11 o'clock
Control contents – room 1 (strong) / room 2 (strong) / room 3 (weak)

| Target device (light) [all on/off] | 18-19h | 19-20h | 20-21h | 21-22h | 22-23h | 23-24h | 24-01h |
|---|---|---|---|---|---|---|---|
| Room 1 | 18-19h | 19-20h | 20-21h | 21-22h | 22-23h | 23-24h | 24-01h |
| Room 2 | 18-19h | 19-20h | 20-21h | 21-22h | 22-23h | 23-24h | 24-01h |
| Living room | 18-19h | 19-20h | 20-21h | 21-22h | 22-23h | 23-24h | 24-01h |

2210

(a)          (b)          (c)

(a)          (b)          (c)

DIGITAL DEVICE AND METHOD OF PROCESSING DATA USING THE SAME

This application claims the benefit of Korean Patent Application No. 10-2015-0141574, filed on Oct. 8, 2015, which is hereby incorporated by reference as if fully set forth herein.

BACKGROUND OF THE INVENTION

Field of the Invention

The present invention relates to a digital device, and more particularly, to a method of implementing a smart adaptive alarm system using a digital device and a method of processing data using the same.

Discussion of the Related Art

Subsequent to stationary devices such as a personal computer (PC) or a television (TV), mobile devices such as a smartphone or a tablet PC have been remarkably developed. Although stationary devices and mobile devices have been independently developed in respective areas, recently, the areas of the stationary devices and the mobile devices are becoming ambiguous according to a boom in digital convergence.

Recently, interest in IoT (Internet of Things) is growing and study on real-time data communication and control via internet connection between devices is in progress. Applying the IoT to a home network, a building network and the like is mainly discussing. However, since an IoT-based controlling device still has a limitation in turning on/off or making a reservation for a target device and a standard for the IoT is not completely ready, supporting environment for the IoT is not sufficient.

Meanwhile, although a legacy digital TV or a mobile terminal provides weather information via data broadcasting or weather application, the weather information is just simple information.

Hence, since a user simply receives passive weather information via the aforementioned device, it is necessary for the user to actively or directly control one or more devices connected via a network based on the received weather information, thereby increasing inconvenience of the user.

SUMMARY OF THE INVENTION

In order to resolve the inconvenience, the present specification discloses a digital device and a method of processing data in the digital device capable of resolving the inconvenience.

One object of the present invention is to provide a EWG (electronic weather guide) or an SWSG (smart weather service guide) of a form similar to an EPG (electronic program guide) based on various information such as weather, schedule, etc.

Another object of the present invention is to configure an SWSG (smart weather service guide) based on personalized data according to a status of a user, a situation, an input, etc. and provide a smart system customized to the user, i.e., an SAAS (smart adaptive alarm system).

The other object of the present invention is to actively or automatically control devices in an SAAS connected via a network based on an SWSG.

In the present specification, various embodiments for a digital device and a method of processing data in the digital device are disclosed.

To achieve these and other advantages and in accordance with the purpose of the present invention, as embodied and broadly described, according to one embodiment, a method of processing data in a smart adaptive alarm system including at least one controlling device and at least one target device includes storing weather information, identification information of the controlling device, and sensing information of a sensor adjacent to the target device in a server, receiving a service guide display request in the controlling device, receiving the stored weather information, the identification information of the controlling device, and the sensing information of the sensor adjacent to the target device from the server in the controlling device, generating and displaying a service guide based on the received information in the controlling device, generating a control command for controlling the target device according to a configuration set from the displayed service guide in the controlling device, controlling the target device according to the generated control command, and displaying a control result of the target device by returning the result in the controlling device.

To further achieve these and other advantages and in accordance with the purpose of the present invention, as embodied and broadly described, according to a different embodiment, a method of processing data in a smart adaptive alarm system including at least one controlling device and at least one target device includes storing weather information, identification information of the controlling device, and sensing information of a sensor adjacent to the target device in a server, receiving a service guide display request in the controlling device, displaying a service guide in the controlling device, receiving an input of driving information in the controlling device, providing one or more recommendation paths in the controlling device based on the driving information and displaying anticipated time of the recommendation paths and weather data of the anticipated time by making a request for the anticipated time and the weather data to the server, displaying detail data and recommendation data on a specific path according to a user selection, generating and transmitting a control command for controlling the target device according to the detail data and the recommendation data on the displayed path, and displaying return data of the target device in the controlling device.

To further achieve these and other advantages and in accordance with the purpose of the present invention, as embodied and broadly described, according to one embodiment, a smart adaptive alarm system including at least one controlling device and at least one target device includes a server configured to store weather information, identification information of the controlling device, and sensing information of a sensor adjacent to the target device, a controlling device configured to receive a service guide display request, to receive the stored weather information, the identification information of the controlling device, and the sensing information of the sensor adjacent to the target device from the server, to generate and display a service guide based on the received information, to generate a control command for controlling the target device according to a configuration set from the displayed service guide, and to display a control result of the target device by returning the result, and a target device configured to be controlled according to the control command and to return the control result.

To further achieve these and other advantages and in accordance with the purpose of the present invention, as embodied and broadly described, according to a different embodiment, a smart adaptive alarm system including at least one controlling device and at least one target device includes a server configured to store weather information, identification information of the controlling device, and sensing information of a sensor adjacent to the target device, a controlling device configured to display a service guide by configuring the service guide according to a service guide display request, to receive an input of driving information, to provide one or more recommendation paths based on the driving information, to display anticipated time of the recommendation paths and weather data of the anticipated time by making a request for the anticipated time and the weather data to the server, to display detail data and recommendation data on a specific path according to a user selection, to generate and transmit a control command for controlling the target device according to the detail data and the recommendation data on the displayed path, and a target device configured to operate according to the control command and to return a result of the operation to the controlling device.

Technical solutions obtainable from the present invention are non-limited the above mentioned technical solutions. And, other unmentioned technical solutions can be clearly understood from the following description by those having ordinary skill in the technical field to which the present invention pertains.

Technical tasks obtainable from the present invention are non-limited the above mentioned technical tasks. And, other unmentioned technical tasks can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 3 illustrates a block diagram for the digital device according to a different embodiment of the present invention.

FIGS. 9 to 11 illustrate diagrams for a smart weather service guide (SWSG) according to one embodiment of the present invention.

FIGS. 12 to 14 illustrate diagrams for a smart weather service guide (SWSG) according to a different embodiment of the present invention.

FIGS. 15 to 24 illustrate diagrams for a smart weather service guide (SWSG) according to a further different embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components can be provided with the same reference numbers, and description thereof will not be repeated.

In general, a suffix such as "module" and "unit" can be used to refer to elements or components. Use of such a suffix herein is merely intended to facilitate description of the specification, and the suffix itself is not intended to give any special meaning or function. Meanwhile, such an ordinal number as 'first, 'second', 'third' and the like can have a meaning of an order. Yet, the terminologies can be used for the purpose of distinguishing one component from another component capable of being overlapped with each other. In the present disclosure, that which is well-known to one of ordinary skill in the relevant art has generally been omitted for the sake of brevity.

The accompanying drawings are used to help easily understand various technical features and it should be understood that the embodiments presented herein are not limited by the accompanying drawings.

As such, the present disclosure should be construed to extend to any alterations, equivalents and substitutes in addition to those which are particularly set out in the accompanying drawings.

Figure 4:
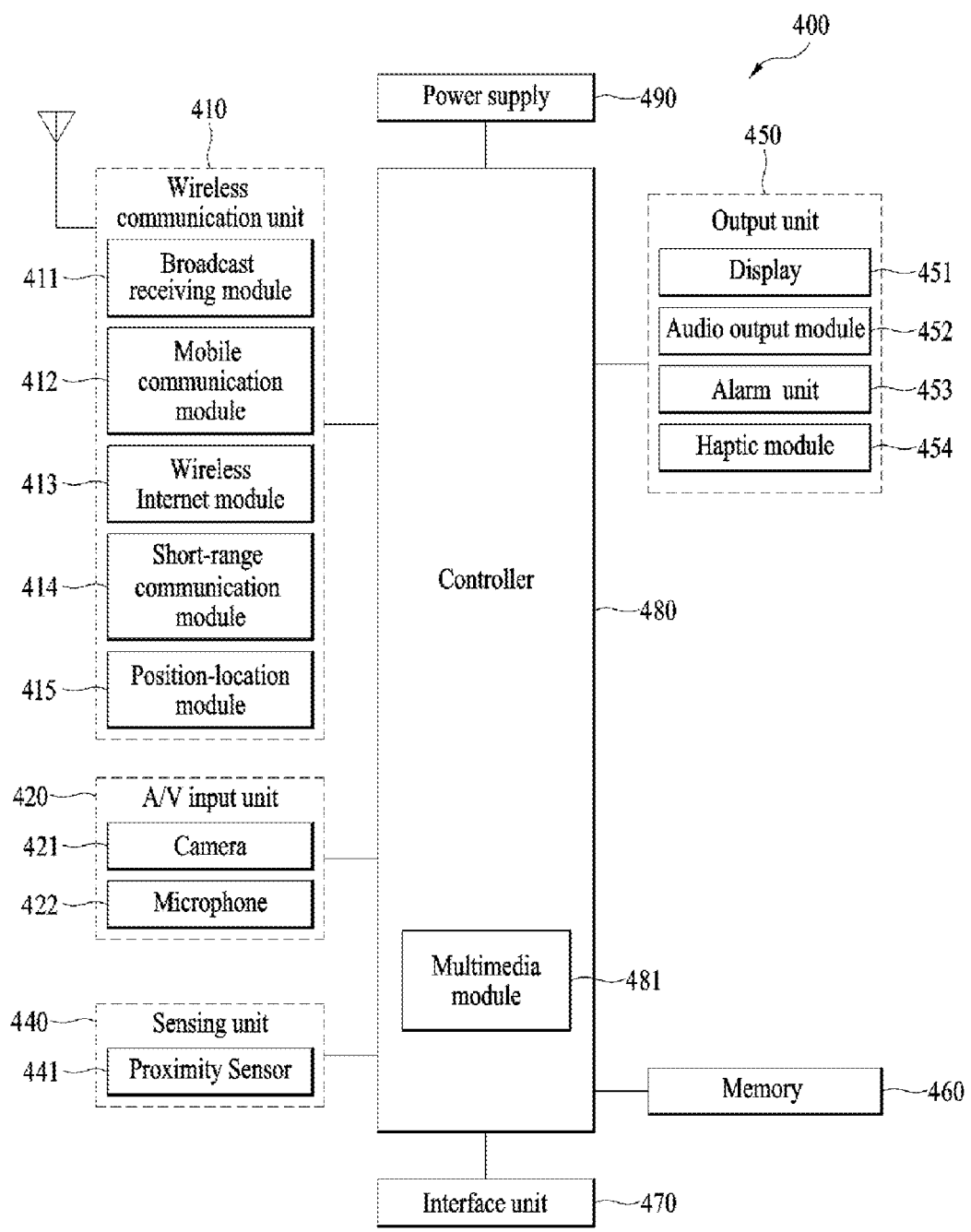
FIG. 4 illustrates a block diagram of a digital device according to another embodiment of the present invention.
Figure 5:
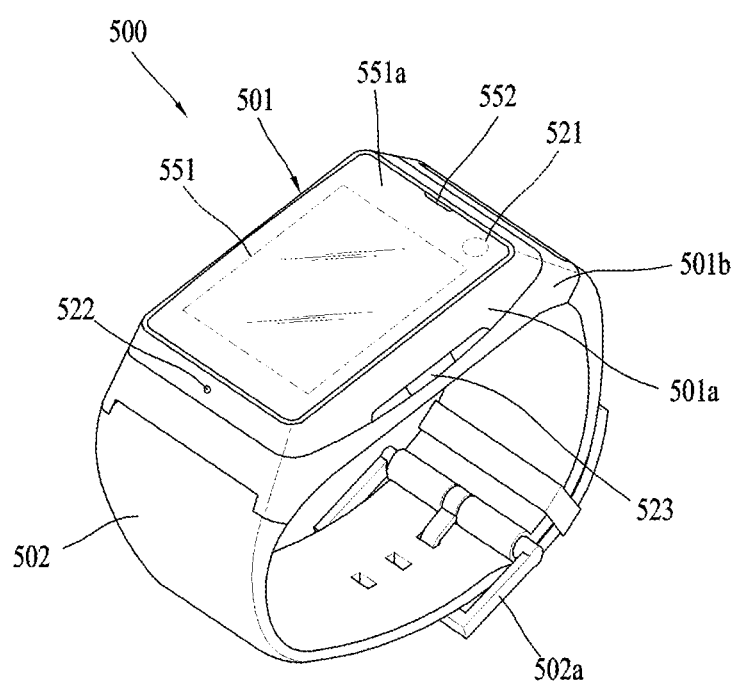
FIG. 5 illustrates a digital receiver according to another embodiment of the present invention.

A digital device according to the present invention as set forth herein can be any device that can handle any one of transmitting, receiving, handling and outputting data, content, servicer, application, and so forth. The digital device can be connected to other digital devices through wired network or wireless network, paired or connected to external server, and through the connections, the digital device can transmit and receive the prescribed data. Examples of the digital device can include standing devices such as a network TV, a Hybrid Broadcast Broadband TV (HBBTV), a smart TV, Internet Protocol TV (IPTV), and personal computer (PC), or mobile/handheld devices such as a Personal Digital Assistant (PDA), smart phone, tablet PC, or Notebook computer. For convenience of description, in this specification, Digital TV is used in FIGS. 2 to 3 and mobile device is used in FIGS. 4 to 5 depicting the digital device. Further, the digital device in this specification can be referred to configuration having only a panel, set-top box (STB), or a set including the entire system.

Moreover, the wired or wireless network described in this specification can refer to various pairing method, standard telecommunication network protocol methods supported for transmitting and receiving data between digital devices or between digital device and external server. The wired or wireless network also includes various telecommunication network protocols supported now as well as in the future. Examples of the wired or wireless network include wired network supported by various telecommunication standard such as Universal Serial Bus (USB), Composite Video Banking Sync (CVBS), Component, S-Video (analog), Digital Visual Interface (DVI), High Definition Multimedia Interface (HDMI), RGB, D-SUB and so forth, and wireless network supported by various standards including Bluetooth, Radio Frequency Identification (RFID), infrared Data Association (IrDA), Ultra Wideband (UWB), ZigBee, Digital Living Network Alliance (DLNA), Wireless LAN (WLAN)(Wi-Fi), Wireless broadband (Wibro), World Interoperability for Microwave Access (Wimax), High Speed Downlink Packet (HSDPA), Long Term Evolution/LTE-Advanced (LTE/LTE-A), Wi-Fi direct, and so forth.

In the following, various embodiments for a method of processing data in a digital device according to the present invention are explained in detail with reference to the attached drawings.

In particular, the present specification discloses a smart adaptive alarm system (SAAS) in which a plurality of digital devices are included. In particular, the smart adaptive alarm system (SAAS) according to the present invention may operate based on weather information and the like. In relation to this, the present specification discloses a smart weather service guide (SWSG) related to the weather information and embodiments for controlling one or more digital devices connected with each other using a network via the smart weather service guide (SWSG) are described. The smart adaptive alarm system (SAAS) and the smart weather service guide (SWSG) correspond to terminologies borrowed to help the understanding of the present invention and clarity. Hence, the present invention may be non-limited by the terminologies.

Figure 1:
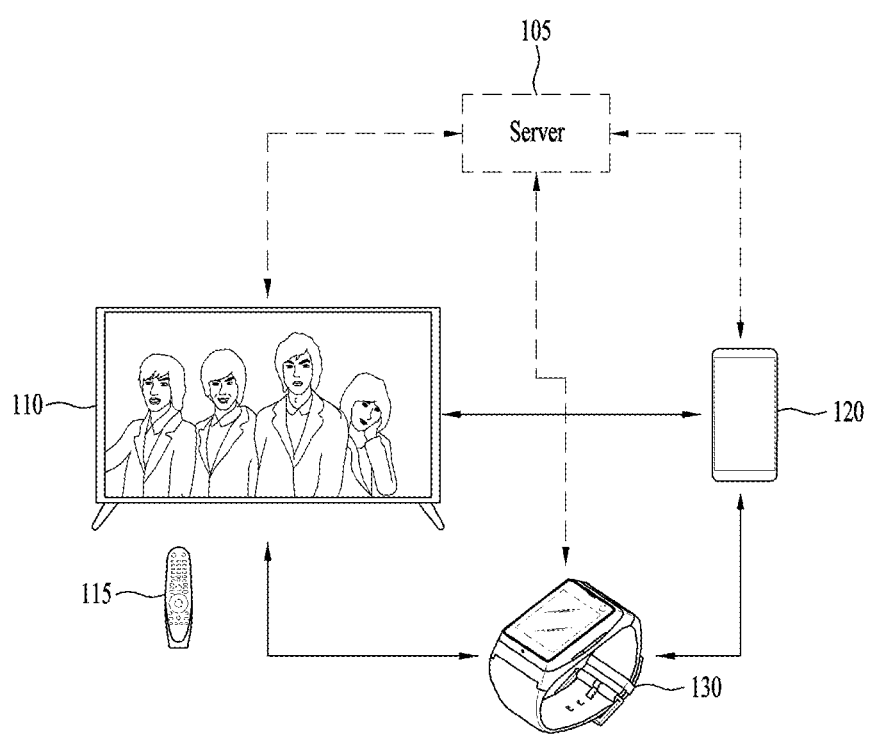
FIG. 1 illustrates a schematic diagram of a service system according to one embodiment of a present disclosure.

FIG. 1 illustrates a schematic diagram of a service system according to one embodiment of a present disclosure.

Referring to FIG. 1, the service system may include a server 105 and a DTV 110, basically. Here, the DTV 110 may be replaced to a mobile device (e.g., a smart phone) 120 or a wearable device 130. Or, the service system further includes the mobile device 120 or the wearable device 130. And, the DTV 110 can be controlled by a controlling means including a dedicated remote controller 115, and the like.

The digital device includes a user interface (UI) for receiving a signal for executing an application and a signal for requesting to provide a keyboard during execution of the application, a controller for transmitting a first control command for requesting the external device for keyboard input data, if it is paired with an external device having a high priority related to providing a keyboard more than the digital device, outputting keyboard input data received from the external device in response to the first control command, controlling an operation based on the output keyboard input data, and controlling the keyboard input termination, and an output unit for outputting text data corresponding to an application execution image and text data corresponding to the received keyboard input data.

According to an embodiment of the present invention, a smart adaptive alarm system including at least one controlling device and at least one target device includes a server configured to store weather information, identification information of the controlling device, and sensing information of a sensor adjacent to the target device, a controlling device configured to receive a service guide display request, to receive the stored weather information, the identification information of the controlling device, and the sensing information of the sensor adjacent to the target device from the server, to generate and display a service guide based on the received information, to generate a control command for controlling the target device according to a configuration set from the displayed service guide, and to display a control result of the target device by returning the result, and a target device configured to be controlled according to the control command and to return the control result. According to another embodiment of the present invention, a smart adaptive alarm system including at least one controlling device and at least one target device includes a server configured to store weather information, identification information of the controlling device, and sensing information of a sensor adjacent to the target device, a controlling device configured to display a service guide by configuring the service guide according to a service guide display request, to receive an input of driving information, to provide one or more recommendation paths based on the driving information, to display anticipated time of the recommendation paths and weather data of the anticipated time by making a request for the anticipated time and the weather data to the server, to display detail data and recommendation data on a specific path according to a user selection, to generate and transmit a control command for controlling the target device according to the detail data and the recommendation data on the displayed path, and a target device configured to operate according to the control command and to return a result of the operation to the controlling device.

Figure 2:
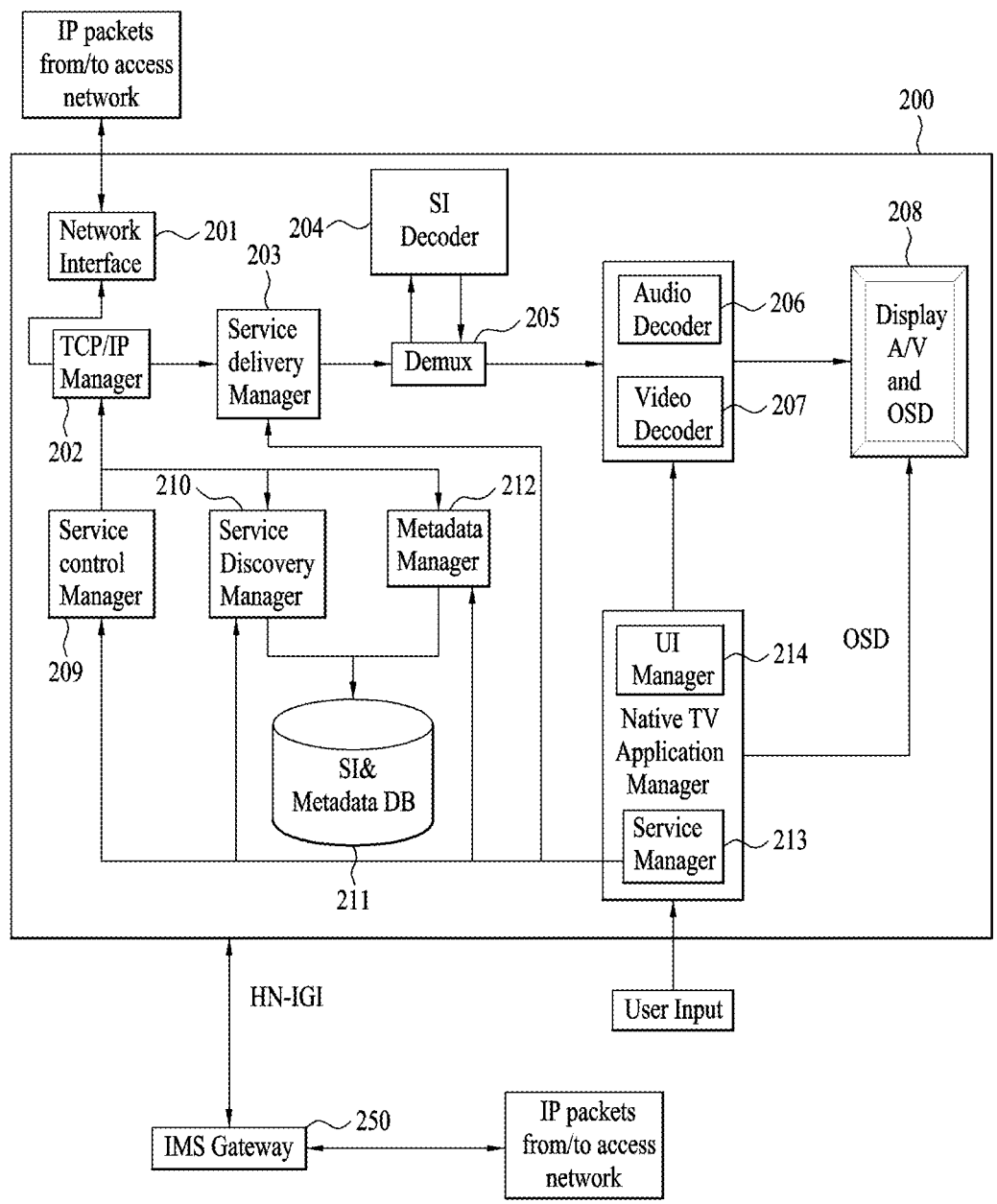
FIG. 2 illustrates a block diagram for a digital device according to one embodiment of the present invention.

FIG. 2 illustrates a block diagram of the digital device according to one embodiment of a present disclosure.

In the disclosure, the digital device 200 can correspond to the DTV 110 shown in FIG. 1.

The digital device 200 can include a network interface unit 201, a TCP/IP (Transfer Control Protocol/Internet Protocol) manager 202, a service delivery manager 203, an SI (System Information, Service Information or Signaling Information) decoder 204, a demultiplexer 205, an audio decoder 206, a video decoder 207, a display A/V (Audio/Video) and OSD (On Screen Display) module 208, a service control manager 209, a service discovery manager 210, a SI&metadata database (DB) 211, a metadata manager 212, a service manager 213, a UI (User Interface) manager 214, etc.

The network interface unit (or a receiving unit) 201 can receive or transmit IP packets or IP datagrams (hereinafter, referred as IP packets) through an accessed network. As an example, the network interface unit 201 can receive service, application, content, etc., from a service provider through the network.

The TCP/IP manager 202 is involved in a packet delivery of IP packets transmitted to the digital device 200 and IP packets transmitted from the digital device 200 between a source and a destination. The TCP/IP manager 202 may classify received packets according to an appropriate protocol and output the classified packets to the service delivery manager 205, the service discovery manager 210, the service control manager 209, and the metadata manager 212, etc.

The service delivery manager 203 can control received service data. For example, the service delivery manager 203 can use a Real-Time Protocol/Real-Time Control Protocol (RTP/RTCP) to control real-time streaming data. If the real-time streaming data is transmitted using the RTP, the service delivery manager 203 can parse a received real-time streaming data packet, transmitted based on the RTP, and transmit the parsed data packet to the demultiplexer 205 or store the parsed data packet in the SI & metadata DB 211 under the control of the service manager 213. The service delivery manager 203 can provide feedback of the network reception information to the server based on the RTCP.

The demultiplexer 205 can demultiplex audio data, video data, SI data from a received packet and transmit the demultiplexed data to each of the audio/video decoder 206/207 and the SI decoder 204.

The SI decoder 204 can decode the demultiplexed SI data such as program specific information (PSI), program and system information protocol (PSIP), digital video broadcast-service information (DVB-SI), digital television terrestrial multimedia broadcasting/coding mobile multimedia broadcasting (DTMB/CMMB), etc. The SI decoder 204 can store the decoded SI data in the SI & metadata DB 211. The SI data stored in the SI & metadata DB 211 can be read and extracted by a component which requires the SI data according to user request, for example.

The audio decoder 206 and the video decoder 207 can decode the demultiplexed audio and video data, respectively. The decoded audio data and video data can be displayed on a display screen of the display unit 208.

The application manager can include the service manager 213 and the UI manager 214, for example. The application manager can perform a function of the controller of the digital device 200. In other words, the application manager can administrate the overall state of the digital receiver 200, provides a UI, and manage other mangers.

The UI manager 214 can provide a graphic user interface (GUI)/UI for the user using OSD, etc. And, the UI manager 214 can receive a key input from the user and perform an operation of the device in response to the received key input. For example, the UI manager 214 can transmit a key input signal to the service manager 213 if the key input signal of selecting a channel is received from the user.

The service manager 213 can control service-related managers such as the service delivery manager 203, the service discovery manager 210, the service control manager 209, and the metadata manager 212.

The service manager 213 can generate a channel map and control a channel selection using the generated channel map according to the received key input from the UI manager 214. The service manager 213 can receive service information from the SI decoder 204 and set audio/video PID (packet identifier) of a selected channel to the demultiplexer 205. The set audio/video PID can be used for the demultiplexing procedure. Accordingly, the demultiplexer 2405 can filter the audio data, video data and SI data using the PID (PID filtering or section filtering.)

The service discovery manager 210 can provide information required to select a service provider that provides a service. Upon receipt of a signal for selecting a channel from the service manager 213, the service discovery manager 210 discovers or searches a service based on the received signal.

The service control manager 209 can select and control a service. For example, the service control manager 209 can use perform service selection and control using IGMP or real time streaming protocol (RTSP) when the user selects a live broadcast service, and using RTSP when the user selects a VOD service. The RTSP can provide a trick mode for the real-time streaming. Also, the service manager 213 can initialized and manage a session through the IMS (IP Multimedia Subsystem) gateway 250 using IMS and SIP (Session Initiation Protocol.) The above protocols are just an example and other protocols can be used depending on an implementation.

The metadata manager 212 can manage metadata regarding services and store metadata in the SI & metadata DB 211.

The SI & metadata DB 211 can store SI data decoded by the SI decoder 204, metadata managed by the metadata manager 212, and information required to select a service provider, which is provided by the service discovery manager 210. In addition, the SI & metadata DB 211 can store system set-up data, etc.

The SI & metadata DB 211 can be implemented using a Non-Volatile RAM (NVRAM) or a Flash memory, and the like.

An IMS gateway 250 can be a gateway that collects functions required to access IPTV services based on an IMS.

FIG. 3a illustrates a block diagram of a digital device according to other embodiment of the present disclosure.

The digital device according to another embodiment of the present disclosure can include a broadcast receiving unit 305, an external device interface 316, a storage unit 318, a user input interface 320, a controller 325, a display unit 330, an audio output unit 335, a power supply unit 340, and a photographing unit (not shown). Here, the broadcast receiving unit 305 can include at least one of tuner 310 and a demodulator 312, and a network interface 314. The broadcast receiving unit 305 can include the tuner 310 and the demodulator 312 without the network interface 314, or can include the network interface 314 without the tuner 310 and the demodulator 312. The broadcast receiving unit 305 can include a multiplexer (not shown) to multiplex a signal, which is demodulated by the demodulator 312 via the tuner 310, and a signal received through the network interface 314. In addition, the broadcast receiving unit 305 can include a demultiplexer (not shown) and demultiplex a multiplexed signal, a demodulated signal, or a signal received through the network interface 314.

The tuner 310 can receive a radio frequency (RF) broadcast signal, through an antenna, by tuning to a channel selected by the user or all previously stored channels. Also, the tuner 310 can convert the received RF broadcast signal into an IF (Intermediate Frequency) signal or a baseband signal.

For example, if the received RF broadcast signal is a digital broadcast signal, it is converted to a digital IF (DIF) signal, and if the received RF broadcast signal is an analog broadcast signal, it is converted to an analog baseband image or a voice signal (CVBS/SIF). That is, the tuner 310 can process both the digital broadcast signal and the analog broadcast signal. The analog baseband image or a voice signal output from the tuner 310 can be directly input to the controller 325.

The tuner 310 can receive a RF broadcast signal of single carrier or multiple carriers. The tuner 310 can sequentially tune and receive a RF broadcast signal of all broadcast channel stored by a channel memory function among RF broadcast signal received through an antenna to. And, the tuner 310 can convert the received RF broadcast signal into the DIF.

The demodulator 312 receives the DIF signal, demodulates the received DIF signal, and performs a channel decoding, etc. For this, the demodulator 312 includes a trellis decoder, a de-interleaver, a Reed-Solomon decoder, etc., or includes a convolution decoder, the de-interleaver, the Reed-Solomon decoder, etc.

The demodulator 312 can outputs a transport stream (TS) after performing a demodulation and a channel decoding. At this time, the TS signal can be a signal by multiplexing a video signal, an audio signal or a data signal. As an example, the TS signal can be an MPEG-2 TS by multiplexing an MPEG-2 standard video signal, a Dolby (AC-3 standard) audio signal, etc.

A TS signal output from the demodulator 312 can be input to the controller 325. The controller 325 can control demultiplexing, processing audio/video signal, etc. Furthermore, the controller 325 can control outputting video through the display unit 330 and outputting audio through the audio output unit 335.

The external device interface 316 can provide an environment for interfacing external devices with the digital device. To implement this, the external device interface 316 can include an A/V input/output unit (not shown) or an RF communication unit (not shown).

The external device interface 316 can be connected with external devices such as a digital versatile disk (DVD), a Blu-ray player, a game device, a camera, a camcorder, a computer (including a notebook computer), a tablet PC, a smart phone, a Bluetooth device, a Cloud server and the like in a wired/wireless manner. The external device interface 316 transfer a signal to the controller 325 of the digital device. The signal includes image data, video data, audio data which is input through an external device. The external device is connected to the digital device. The controller 325 can control to output the signal including the processed image data, the processed video data and the processed audio data to the connected external device. For this, the external device interface 316 can further include an A/V input/output unit or a wireless communication unit (not shown).

The A/V input/output unit may include a USB terminal, a CVBS terminal, a component terminal, an S-video terminal (analog), a DVI terminal, a HDMI terminal, an RGB terminal, a D-SUB terminal, etc.

The RF communication unit can perform near field communication. The digital device can be networked with other electronic apparatuses according to communication protocols such as Bluetooth, RFID, IrDA, UWB, ZigBee, and DLNA, for example.

Also, the external device interface 316 can connect a STB via at least one interface described above, and perform an input/output operation with the connected STB.

Meanwhile, the external device interface 316 can receive application or application list included in a nearby external device, and can transfer the application or the application list to the controller 325 or the storage unit 318.

The network interface 314 may provide an interface for connecting the digital device to wired/wireless networks.

Using the network interface 314, the digital receiver can transmit/receive data to/from other users or other electronic apparatuses or access a predetermined web page through a network connected thereto or another network linked to the connected network.

The network interface 314 can selectively receive a desired application from among publicly open applications through a network.

Also, the network interface 314 can select a wanted application among open applications and the selected application via a network.

The storage unit 318 may store programs for signal processing and control and store a processed video, audio or data signal.

In addition, the storage unit 318 may execute a function of temporarily storing a video, audio or data signal input from the external device interface 316 or the network interface 314. The storage unit 318 may store information about a predetermined broadcast channel through a channel memory function.

The storage unit 318 can store an application or a list of applications input from the external device interface 316 or the network interface 314.

The storage unit 318 may store various platforms which will be described later.

The storage unit 318 can include storage media of one or more types, such as a flash memory type, a hard disk type, a multimedia card micro type, a card type memory (e.g., SD or XD memory), RAM, EEPROM, etc. The digital device may reproduce content files (e.g., a video file, a still image file, a music file, a text file, an application file, etc.) and provide them to the user.

While FIG. 3a illustrates an embodiment in which the storage unit 318 is separated from the controller 325, the configuration of the digital device is not limited thereto and the storage unit 318 may be included in the controller 325.

The user input interface 320 may transmit a signal input by the user to the controller 325 or deliver a signal output from the controller 325 to the user.

For example, the user input interface 320 can receive control signals such as a power on/off signal, a channel selection signal, an image setting signal, etc. from the remote controller or transmit control signals of the controller 325 to the remote controller according to various communication schemes such as RF communication, IR communication, and the like.

The user input interface 320 can transmit control signals input through a power key, a channel key, a volume key, and a local key (not shown) of a set value to the controller 325.

The user input interface 320 can transmit a control signal input from a sensing unit (not shown) which senses a gesture of the user or deliver a signal of the controller 325 to the sensing unit. Here, the sensing unit may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 325 can generate and output a signal for video or audio output by demultiplexing streams input through the tuner 310, the demodulator 312 or the external device interface 316 or processing demultiplexed signals.

A video signal processed by the controller 325 can be input to the display unit 330 and displayed as an image through the display unit 330. In addition, the video signal processed by the controller 325 can be input to an external output device through the external device interface 316.

An audio signal processed by the controller 325 can be applied to the audio output unit 335. Otherwise, the audio signal processed by the controller 325 can be applied to an external output device through the external device interface 316.

The controller 325 may include a demultiplexer and an image processor, which are not shown in FIG. 3a.

The controller 325 can control the overall operation of the digital device. For example, the controller 325 can control the tuner 310 to tune to an RF broadcast corresponding to a channel selected by the user or a previously stored channel.

The controller 325 can control the digital device according to a user command input through the user input interface 320 or an internal program. Particularly, the controller 325 can control the digital device to be linked to a network to download an application or application list that the user desires to the digital device.

For example, the controller 325 may control the tuner 310 to receive a signal of a channel selected in response to a predetermined channel selection command received through the user input interface 320. In addition, the controller 325 may process a video, audio or data signal corresponding to the selected channel. The controller 325 may control information on a channel selected by the user to be output with a processed video or audio signal through the display unit 330 or the audio output unit 335.

Alternatively, the controller 325 may control a video signal or an audio signal received from an external apparatus, for example, a camera or a camcorder through the external device interface 316 to be output through the display unit 330 or the audio output unit 335 according to an external device image reproduction command received through the user input interface 316.

The controller 325 can control the display unit 330 to display images. For example, the controller 325 can control a broadcast image input through the tuner 310, an external input image received through the external device interface 316, an image input through the network interface 314, or an image stored in the storage unit 318 to be displayed on the display unit 330. Here, an image displayed on the display unit 330 can be a still image or video, and it can be a 2D or 3D image.

The controller 325 can control reproduction of content. Here, the content may be content stored in the digital device, received broadcast content, or content input from an external device. The content may include at least one of a broadcast image, an external input image, an audio file, a still image, an image of a linked web, and a text file.

The controller 325 can control display of applications or an application list, downloadable from the digital device or an external network, when an application view menu is selected.

The controller 325 can control installation and execution of applications downloaded from an external network in addition to various UIs. Furthermore, the controller 325 can control an image relating to an application executed by user selection to be displayed on the display unit 330.

The digital device may further include a channel browsing processor (not shown) which generates a thumbnail image corresponding to a channel signal or an external input signal.

The channel browsing processor can receive a stream signal (e.g., TS) output from the demodulator 312 or a stream signal output from the external device interface 316 and extract an image from the received stream signal to generate a thumbnail image. The generated thumbnail image can be directly input to the controller 325 or can be encoded and then input to the controller 325. Also, the thumbnail image can be coded into a stream and then applied to the controller 325. The controller 325 can display a thumbnail list including a plurality of thumbnail images on the display unit 330 using thumbnail images input thereto. The thumbnail images included in the thumbnail list can be updated sequentially or simultaneously. Accordingly, the user can conveniently check content of a plurality of broadcast channels.

The display unit 330 may convert a video signal, a data signal, and an OSD signal processed by the controller 325 and a video signal and a data signal received from the external device interface 316 into RGB signals to generate driving signals.

The display unit 330 may be a PDP, an LCD, an OLED, a flexible display, a 3D display or the like.

The display unit 330 may be configured as a touch-screen and used as an input device rather than an output device.

The audio output unit 335 receives a signal audio-processed by the controller 325, for example, a stereo signal, a 3.1 channel signal or a 5.1 channel signal, and outputs the received signal as audio. The audio output unit 335 can be configured as one of various speakers.

The digital device may further include the sensing unit for sensing a gesture of the user, which includes at least one of a touch sensor, a voice sensor, a position sensor, and an action sensor, as described above. A signal sensed by the sensing unit can be delivered to the controller 325 through the user input interface 320.

The digital device may further include the photographing unit for photographing the user. Image information acquired by the photographing unit can be supplied to the controller 325.

The controller 325 may sense a gesture of the user from an image captured by the photographing unit or a signal sensed by the sensing unit, or by combining the image and the signal.

The power supply unit 340 may supply power to the digital device.

Particularly, the power supply unit 340 can supply power to the controller 325 which can be implemented as a system-on-chip (SoC), the display unit 330 for displaying images, and the audio output unit 335 for audio output.

The power supply unit 340 can include a converter (not shown) converting a alternating source into a direct source. For example, when the display unit 330 is implemented as a liquid panel including a plurality of backlight lamps, the power supply unit 340 can include an inverter (not shown) which is capable of performing a Pulse Width Modulation (PWM) for changing or dimming a luminance.

The remote control device 345 may transmit user input to the user input interface 320. To achieve this, the remote controller can use Bluetooth, RF communication, IR communication, UWB, ZigBee, etc.

In addition, the remote control device 345 can receive audio, video or data signal output from the user input interface 320 and display the received signal or output the same as audio or vibration.

The above-mentioned digital device can be a digital broadcast receiver which is capable of processing a digital broadcast signal of a fixed or mobile ATSC method, or a digital broadcast signal of a DVB method.

FIG. 3b illustrates a block diagram of a detailed configuration of a controller shown in FIG. 2 to FIG. 3a according to one embodiment of a present disclosure.

The digital receiver according to the present disclosure may include a demultiplexer 350, an image processor, an OSD generator 366, a mixer 370, a frame rate converter (FRC) 385, and an output formatter (or a 3D formatter) 390.

The demultiplexer 350 can demultiplex an input stream signal into an MPEG-2 TS image, an audio signal and a data signal, for example.

The image processor can process a demultiplexed image signal using a video decoder 362 and a scaler 364.

The video decoder 362 can decode the demultiplexed image signal and the scaler 364 can scale the resolution of the decoded image signal such that the image signal can be displayed.

The video decoder 362 can support various standards. For example, the video decoder 362 can perform a function as an MPEG-2 decoder when the video signal is coded in an MPEG-2 standard. The video decoder 362 can perform a function as a H.264/H.265 decoder when the video signal is coded in a digital multimedia broadcasting (DMB) method or the H. 264/H. 265 standard method.

The image signal decoded by the image processor may be input to the mixer 364.

The OSD generator 366 may generate OSD data automatically or according to user input. For example, the OSD generator 366 may generate data to be displayed on the screen of an output unit in the form of an image or text on the basis of a control signal of a user input interface. OSD data generated by the OSD generator 366 may include various data such as a UI image of the digital receiver, various menu screens, widget, icons, and information on ratings. The OSD generator 366 can generate a caption of a broadcast image or data for displaying EPG based broadcast information.

The mixer 370 may mix the OSD data generated by the OSD generator 366 and the image signal processed by the image processor. The mixer 370 may provide the mixed signal to the output formatter 390. By mixing the decoded image signal and the OSD data, OSD may be overlaid on a broadcast image or external input image.

The FRC 380 may convert a frame rate of input video. For example, the frame rate converter 380 can convert the frame rate of an input 60 Hz video to a frame rate of 120 Hz or 240 Hz, according to an output frequency of the output unit. The FRC 380 may be bypassed when frame conversion is not executed.

The output formatter 390 may change the output of the FRC 380, which is input thereto, into a form suitable for the output format of the output unit. For example, the output formatter 390 can output an RGB data signal. In this case, this RGB data signal can be output according to low voltage differential signaling (LVDS) or mini-LVDS. When a 3D image signal output from the FRC 380 is input to the 3D formatter 760, the output formatter 390 can format the 3D image signal such that the 3D image signal is matched to the output format of the output unit, to thereby support a 3D service.

An audio processor (not shown) may audio-process a demultiplexed audio signal. The audio processor can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor can include decoders corresponding to the formats to process the audio signals.

Furthermore, the audio processor can control base, treble and volume.

In addition, a data processor (not shown) can process a demultiplexed data signal. For example, when a demultiplexed data signal is encoded, the data processor can decode the encoded demultiplexed data signal. Here, the encoded data signal may be EPG information including broadcast information such as the start time and end time (or duration) of a broadcast program which is broadcast through each channel.

Meanwhile, the above-mentioned digital device, as an embodiment according to the present disclosure, each component can be integrated, added or omitted according to a capability of the digital device which is actually implemented. That is, if necessary, at least two components are united into a single component or a single component is divided into at least two components. Also, a function performed by each block explains an embodiment of the present disclosure, the specific operation or device is not limited to a scope of the present disclosure.

Meanwhile, the digital device can be an image signal processing device for performing a signal of an input image or an image stored in the device. Other example of the image signal device can be a STB which does not include the display unit and the audio output unit shown, a DVD player, a Blu-ray player, a game device, a computer, etc.

FIG. 4 illustrates a block diagram of a digital device according to another embodiment of the present disclosure.

FIGS. 2 through 3 explained above refers to a standing device as according to an embodiment of the digital device, but FIGS. 4 through 5 refer to a mobile device as another embodiment of the digital device.

With reference to FIG. 4, the mobile terminal 400 can include a wireless communication unit 410, an A/V input unit 420, a user input unit 430, a sensing unit 440, an output unit 450, a memory 460, an interface unit 470, a controller 480, and a power supply unit 490.

The wireless communication unit 410 typically includes one or more components which permit wireless communication between the mobile terminal 400 and a wireless communication system or network within which the mobile terminal 400 is located. For instance, the wireless communication unit 410 can include a broadcast receiving module 411, a mobile communication module 412, a wireless Internet module 413, a short-range communication module 414, and a position-location module 415.

The broadcast receiving module 411 receives a broadcast signal and/or broadcast associated information from an external broadcast managing server via a broadcast channel. The broadcast channel may include a satellite channel and a terrestrial channel. At least two broadcast receiving modules 411 can be provided in the mobile terminal 400 to facilitate simultaneous reception of at least two broadcast channels or broadcast channel switching.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 412.

The broadcast associated information can be implemented in various forms. For instance, broadcast associated information may include an electronic program guide (EPG) and an electronic service guide (ESG).

The broadcast receiving module 511 may be configured to receive broadcast signals transmitted from various types of broadcast systems. By non-limiting example, such broadcasting systems may include digital video broadcasting-Terrestrial (DVB-T), DVB-Satellite (DVB-S), DVB-Handheld (DVB-H), DVB-Convergence of Broadcasting and Mobile Services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 511 can be configured to be suitable for other broadcasting systems as well as the above-noted digital broadcasting systems.

The broadcast signal and/or broadcast associated information received by the broadcast receiving module 411 may be stored in a suitable device, such as the memory 460.

The mobile communication module 412 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 413 supports Internet access for the mobile terminal 400. This module may be internally or externally coupled to the mobile terminal 400. The wireless Internet technology can include Wi-Fi, Wibro, Wimax, or HSDPA.

The short-range communication module 514 facilitates relatively short-range communications. Suitable technologies for implementing this module include RFID, IrDA, UWB, as well as the networking technologies commonly referred to as Bluetooth™ and ZigBee™, to name a few.

The position-location module 415 identifies or otherwise obtains the location of the mobile terminal 400. According to one embodiment, this module may be implemented with a global positioning system (GPS) module. The GPS module 415 can precisely calculate current 3-dimensional (3D) position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 415 can calculate speed information by continuously calculating a real-time current location.

With continued reference to FIG. 4, the A/V input unit 420 is configured to provide audio or video signal input to the mobile terminal 400. As shown, the A/V input unit 420 includes a camera 421 and a microphone 422. The camera 421 receives and processes image frames of still pictures or video, which are obtained by an image sensor in a video call mode or a photographing mode. Furthermore, the processed image frames can be displayed on the display 451.

The image frames processed by the camera 421 can be stored in the memory 460 or can be transmitted to an external recipient via the wireless communication unit 410. Optionally, at least two cameras 421 can be provided in the mobile terminal 400 according to the environment of usage.

The microphone 422 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 412 in a call mode. The microphone 422 typically includes assorted noise removing algorithms to remove noise generated in the course of receiving the external audio signal.

The user input unit 430 generates input data responsive to user manipulation of an associated input device or devices. Examples of such devices include a keypad, a dome switch, a touchpad (e.g., static pressure/capacitance), a jog wheel, and a jog switch.

The sensing unit 440 provides sensing signals for controlling operations of the mobile terminal 400 using status measurements of various aspects of the mobile terminal. For instance, the sensing unit 440 may detect an open/closed status of the mobile terminal 400, the relative positioning of components (e.g., a display and keypad) of the mobile terminal 400, a change of position (or location) of the mobile terminal 400 or a component of the mobile terminal 400, a presence or absence of user contact with the mobile terminal 400, and an orientation or acceleration/deceleration of the mobile terminal 400. As an example, a mobile terminal 400 configured as a slide-type mobile terminal is considered. In this configuration, the sensing unit 440 may sense whether a sliding portion of the mobile terminal is open or closed. According to other examples, the sensing unit 440 senses the presence or absence of power provided by the power supply unit 490, and the presence or absence of a coupling or other connection between the interface unit 470 and an external device. According to one embodiment, the sensing unit 440 can include a proximity sensor 441.

The output unit 450 generates output relevant to the senses of sight, hearing, and touch. Furthermore, the output unit 450 includes the display 451, an audio output module 452, an alarm unit 453, a haptic module 454, and a projector module 455.

The display 451 is typically implemented to visually display (output) information associated with the mobile terminal 400. For instance, if the mobile terminal is operating in a phone call mode, the display will generally provide a UI or GUI which includes information associated with placing, conducting, and terminating a phone call. As another example, if the mobile terminal 400 is in a video call mode or a photographing mode, the display 451 may additionally or alternatively display images which are associated with these modes, the UI or the GUI.

The display module 451 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 500 may include one or more of such displays.

Some of the displays can be implemented in a transparent or optical transmittive type, i.e., a transparent display. A representative example of the transparent display is the TOLED (transparent OLED). A rear configuration of the display 451 can be implemented as the optical transmittive type as well. In this configuration, a user can see an object located at the rear of a terminal body on a portion of the display 451 of the terminal body.

At least two displays 451 can be provided in the mobile terminal 400 in accordance with one embodiment of the mobile terminal 400. For instance, a plurality of displays can be arranged to be spaced apart from each other or to form a single body on a single face of the mobile terminal 400. Alternatively, a plurality of displays can be arranged on different faces of the mobile terminal 400.

If the display 451 and a sensor for detecting a touch action (hereinafter called 'touch sensor') are configured as a mutual layer structure (hereinafter called 'touch screen'), the display 551 is usable as an input device as well as an output device. In this case, the touch sensor can be configured as a touch film, a touch sheet, or a touchpad.

The touch sensor can be configured to convert pressure applied to a specific portion of the display 451 or a variation of capacitance generated from a specific portion of the display 451 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 480. Therefore, the controller 480 is made aware when a prescribed portion of the display 451 is touched.

Referring to FIG. 4, a proximity sensor 441 can be provided at an internal area of the mobile terminal 400 enclosed by the touch screen or around the touch screen. The proximity sensor 441 is a sensor that detects a presence or non-presence of an object approaching a prescribed detecting surface or an object existing (or located) around the proximity sensor 441 using an electromagnetic field strength or infrared ray without mechanical contact. Hence, the proximity sensor 441 is more durable than a contact type sensor and also has utility broader than the contact type sensor.

The proximity sensor 441 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 452 functions in various modes including a call-receiving mode, a call-placing mode, a recording mode, a voice recognition mode, and a broadcast reception mode to output audio data which is received from the wireless communication unit 410 or is stored in the memory 460. During operation, the audio output module 452 outputs audio relating to a particular function (e.g., call received, message received). The audio output module 452 may be implemented using one or more speakers, buzzers, other audio producing devices, and combinations of these devices.

The alarm unit 453 outputs a signal for announcing the occurrence of a particular event associated with the mobile terminal 400. Typical events include a call received, a message received and a touch input received. The alarm unit 453 can output a signal for announcing the event occurrence by way of vibration as well as video or audio signal. The video or audio signal can be output via the display 451 or the audio output module 452. Hence, the display 451 or the audio output module 452 can be regarded as a part of the alarm unit 453.

The haptic module 454 generates various tactile effects that can be sensed by a user. Vibration is a representative one of the tactile effects generated by the haptic module 454. The strength and pattern of the vibration generated by the haptic module 454 are controllable. For instance, different vibrations can be output by being synthesized (or composited) together or can be output in sequence. The haptic module 454 can generate various tactile effects as well as the vibration. For instance, the haptic module 454 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 454 can be implemented to enable a user to sense the tactile effect through a muscle sense of a finger or an arm as well as to transfer the tactile effect through direct contact. Optionally, at least two haptic modules 454 can be provided in the mobile terminal 400 in accordance with an embodiment of the mobile terminal 400.

The memory 460 is generally used to store various types of data to support the processing, control, and storage requirements of the mobile terminal 400. Examples of such data include program instructions for applications operating on the mobile terminal 400, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 460. Moreover, data for various patterns of vibration and/or sound output in response to a touch input to the touch screen can be stored in the memory 460.

The memory 460 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 400 can operate in association with a web storage for performing a storage function of the memory 560 on the Internet.

The interface unit 470 may be implemented to couple the mobile terminal 400 with external devices. The interface unit 470 receives data from the external devices or is supplied with power and then transfers the data or power to the respective elements of the mobile terminal 400 or enables data within the mobile terminal 400 to be transferred to the external devices. The interface unit 470 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 400 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 500 via the corresponding port.

When the mobile terminal 400 is connected to an external cradle, the interface unit 470 becomes a passage for supplying the mobile terminal 400 with a power from the cradle or a passage for delivering various command signals input from the cradle by a user to the mobile terminal 400. Each of the various command signals input from the cradle or the power can operate as a signal enabling the mobile terminal 400 to recognize that it is correctly loaded in the cradle.

The controller 480 typically controls the overall operations of the mobile terminal 400. For example, the controller 480 performs the control and processing associated with voice calls, data communications, and video calls. The controller 480 may include a multimedia module 481 that provides multimedia playback. The multimedia module 481 may be configured as part of the controller 480, or implemented as a separate component. Moreover, the controller 480 can perform a pattern (or image) recognizing process for recognizing a writing input and a picture drawing input performed on the touch screen as characters or images, respectively.

The power supply unit 490 provides power required by various components of the mobile terminal 400. The power may be internal power, external power, or combinations of internal and external power.

Various embodiments described herein may be implemented in a computer-readable medium using, for example, computer software, hardware, or some combination of computer software and hardware.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 480.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 460, and executed by a controller or processor, such as the controller 480.

FIG. 5 illustrates a perspective view illustrating one example of a watch-type mobile terminal 300 according to an embodiment of the present disclosure. As illustrated in FIG. 5, the watch-type mobile terminal 500 includes a main body 501 with a display unit 551 and a band 502 connected to the main body 501 to be wearable on a wrist. In general, mobile terminal 500 may be configured to include features that are the same or similar to that of mobile terminal 400 of FIG. 4.

The main body 501 may include a case having a certain appearance. As illustrated, the case may include a first case 501*a* and a second case 501*b* cooperatively defining an inner space for accommodating various electronic components. Other configurations are possible. For instance, a single case may alternatively be implemented, with such a case being configured to define the inner space, thereby implementing a mobile terminal 400 with a uni-body.

The watch-type mobile terminal 500 can perform wireless communication, and an antenna for the wireless communication can be installed in the main body 501. The antenna may extend its function using the case. For example, a case including a conductive material may be electrically connected to the antenna to extend a ground area or a radiation area.

The display unit 551 is shown located at the front side of the main body 501 so that displayed information is viewable to a user. In some embodiments, the display unit 551 includes a touch sensor so that the display unit can function as a touch screen. As illustrated, window 551*a* is positioned on the first case 501*a* to form a front surface of the terminal body together with the first case 501*a*.

The illustrated embodiment includes audio output module 552, a camera 521, a microphone 522, and a user input unit 523 positioned on the main body 501. When the display unit 551 is implemented as a touch screen, additional function keys may be minimized or eliminated. For example, when the touch screen is implemented, the user input unit 523 may be omitted.

The band 502 is commonly worn on the user's wrist and may be made of a flexible material for facilitating wearing of the device. As one example, the band 502 may be made of fur, rubber, silicon, synthetic resin, or the like. The band 502 may also be configured to be detachable from the main body 501. Accordingly, the band 202 may be replaceable with various types of bands according to a user's preference.

In one configuration, the band 502 may be used for extending the performance of the antenna. For example, the band may include therein a ground extending portion (not shown) electrically connected to the antenna to extend a ground area.

The band 502 may include fastener 502*a*. The fastener 502*a* may be implemented into a buckle type, a snap-fit hook structure, a Velcro® type, or the like, and include a flexible section or material. The drawing illustrates an example that the fastener 502*a* is implemented using a buckle.

Figure 6:
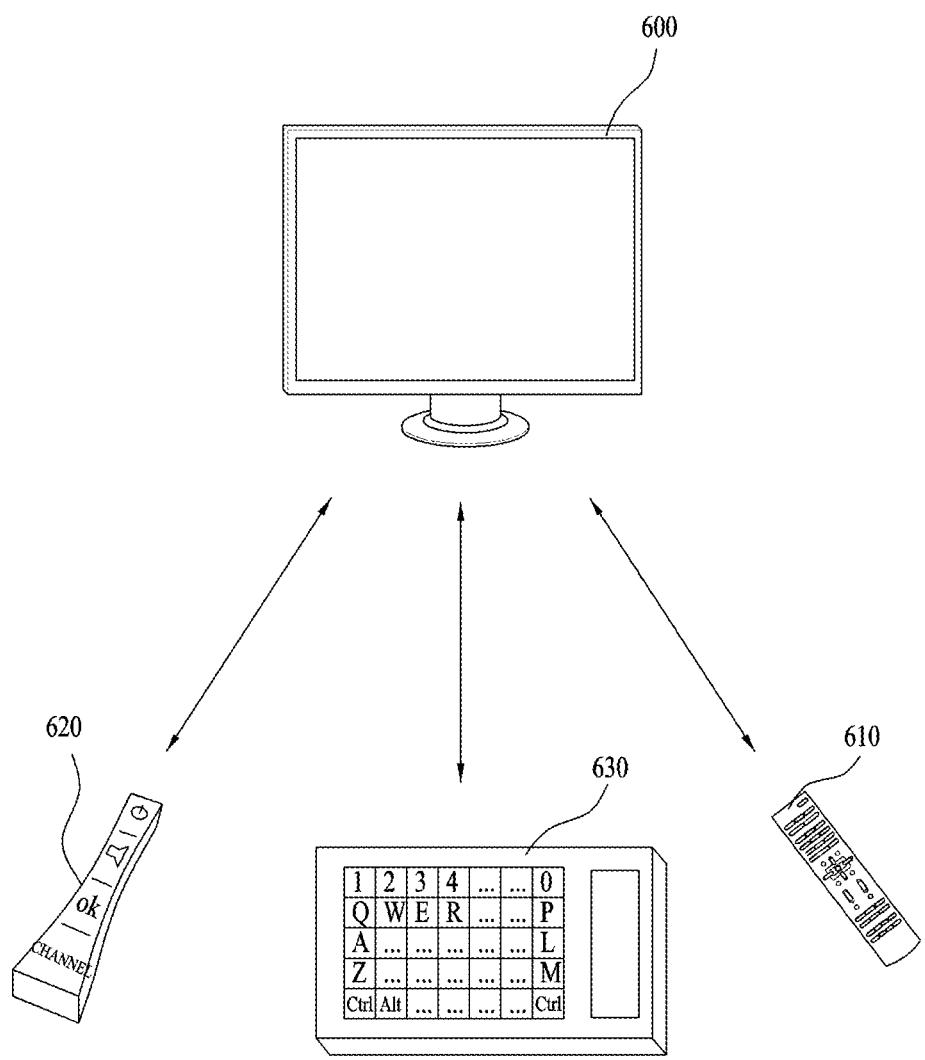
FIG. 6 illustrates remote controllers of a digital receiver according to an embodiment of the present invention.

FIG. 6 illustrates a diagram illustrating a controlling means of a digital device according to one embodiment of the present disclosure.

To execute various operations for implementing the present disclosure according to embodiments, various user interface devices (UIDs) which can communicate with a digital receiver 600 in a wired/wireless manner can be used as remote controllers.

UIDs can include a mobile device (e.g., a smart phone, a tablet PC, and the like), a magic remote controller 620 and a remote controller 630 equipped with a keyboard and a touch pad in addition to a general remote controller 610.

The remote controllers can use various communication protocols such as Bluetooth, RFID, IrDA, UWB, ZigBee, DLNA, etc.

The magic remote controller 620 may include a gyro sensor mounted therein to sense vibration of a user's hand or rotation. That is, the magic remote controller 620 can move a pointer according to up, down, left and right motions of the user such that the user can easily execute a desired action, for example, easily control a channel or a menu.

The remote controller 630 including the keyboard and touch pad can facilitate text input through the keyboard and control of movement of a pointer and magnification and reduction of a picture or video through the touch pad. The keyboard 630 have been implemented so that it is similar to a keyboard of a PC in order to conveniently input text because the traditional remote control 610 is not sufficient enough to control the digital device 600 since the digital device 600 offers more than just providing broadcast programs as it did before, but has advanced into a intelligent integrated digital device providing web browser, application, social network service (SNS) and the like.

Meanwhile, the control means such as the remote control 610, the pointing device 620, and the keyboard 630 can, if necessary, include a touchpad to control functions of text input, move the pointer, enlarging/reducing pictures and video clips more conveniently.

According to one embodiment of the present invention, a method of processing data in a smart adaptive alarm system including at least one controlling device and at least one target device includes storing weather information, identification information of the controlling device, and sensing information of a sensor adjacent to the target device in a server, receiving a service guide display request in the controlling device, receiving the stored weather information, the identification information of the controlling device, and the sensing information of the sensor adjacent to the target device from the server in the controlling device, generating and displaying a service guide based on the received information in the controlling device, generating a control command for controlling the target device according to a configuration set from the displayed service guide in the controlling device, controlling the target device according to the generated control command, and displaying a control result of the target device by returning the result in the controlling device. According to another embodiment of the present invention, a method of processing data in a smart adaptive alarm system including at least one controlling device and at least one target device includes storing weather information, identification information of the controlling device, and sensing information of a sensor adjacent to the target device in a server, receiving a service guide display request in the controlling device, displaying a service guide in the controlling device, receiving an input of driving information in the controlling device, providing one or more recommendation paths in the controlling device based on the driving information and displaying anticipated time of the recommendation paths and weather data of the anticipated time by making a request for the anticipated time and the weather data to the server, displaying detail data and recommendation data on a specific path according to a user selection, generating and transmitting a control command for controlling the target device according to the detail data and the recommendation data on the displayed path, and displaying return data of the target device in the controlling device.

Figure 7:
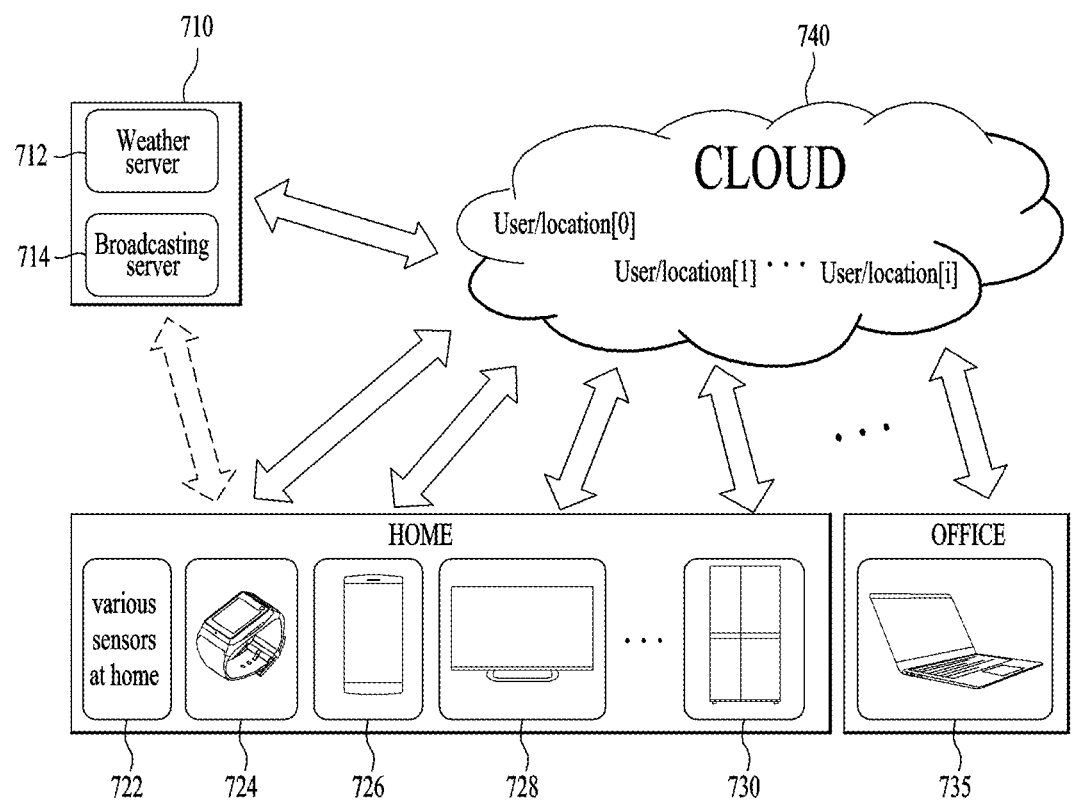
FIG. 7 illustrates a schematic configuration block diagram for a smart adaptive alarm system (SAAS) according to one embodiment of the present invention.

FIG. 7 illustrates a schematic configuration block diagram for a smart adaptive alarm system (SAAS) according to one embodiment of the present invention.

A smart adaptive alarm system (SAAS) according to the present invention is mainly classified into a server and a client.

The server includes such a service server 710 as a broadcasting server 712, a weather server 714, etc. and a cloud server 740. Although FIG. 7 shows a broadcasting server 712 and a weather server 714 as the service server 710 for clarity, by which the present invention may be non-limited. If necessary, various servers can be further included in relation to the present invention.

Meanwhile, the client may correspond to an entity of a group unit such as home, office, and the like. The home entity includes various sensors 722 at home, a smart watch 724, a smartphone 726, a digital TV 728, a refrigerator 730, an air conditioner (not depicted), an LED (light emitting diode) lighting device (not depicted), an electric rice-cooker, and the like. The office entity includes a PC (not depicted), a notebook 735, an air conditioner (not depicted), an LED lighting device, and the like. Besides, it can be able to define a subgroup unit such as a layer unit, and the like according to a configuration of a user and the like in the home or the office. An individual control is also available according to the present invention.

Meanwhile, in the foregoing description, the cloud server 740 generates an individual URL (uniform resource locator) according to a location of an entity such as home, office and the like or a location of each device included in the entity and enables data communication to be performed between the entity and a device included in the entity.

Figure 8:
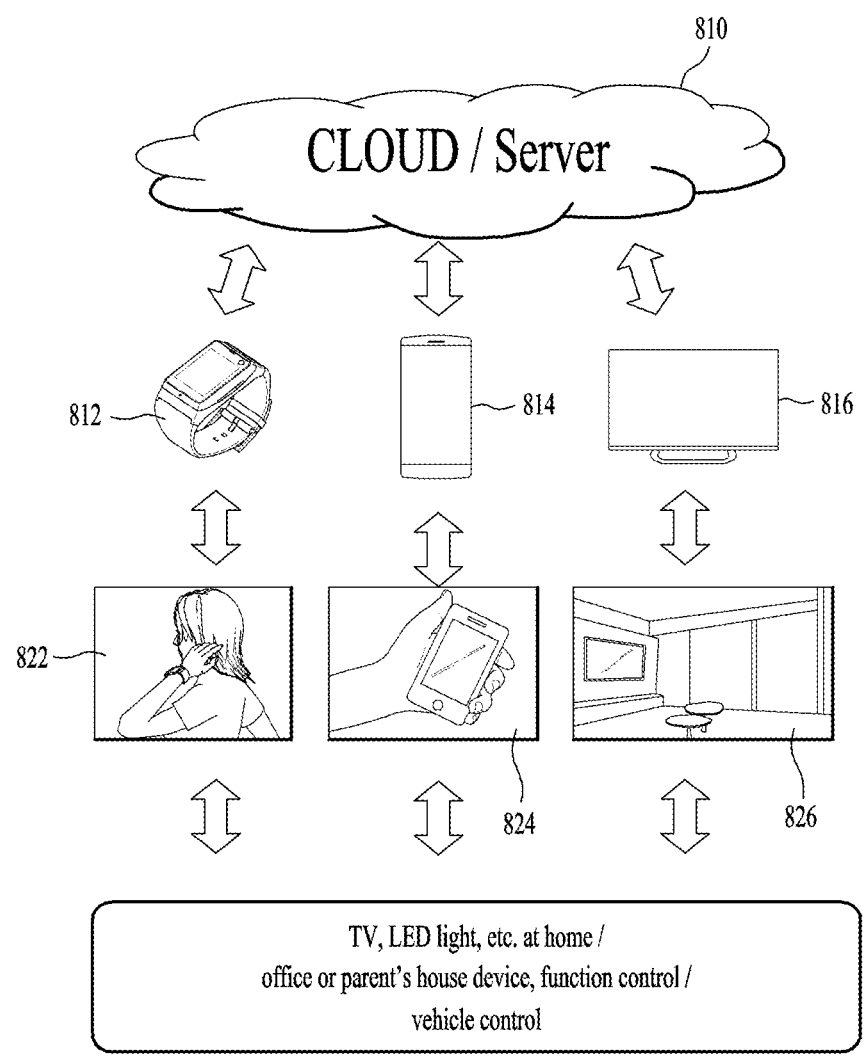
FIG. 8 illustrates a schematic configuration block diagram for a smart adaptive alarm system (SAAS) according to a different embodiment of the present invention.

FIG. 8 illustrates a schematic configuration block diagram for a smart adaptive alarm system (SAAS) according to a different embodiment of the present invention.

For example, FIG. 8 is a diagram for explaining the smart adaptive alarm system (SAAS) shown in FIG. 7 as a hierarchical structure according to a data flow. Yet, in FIG. 8, for clarity, a server 810 is shown and explained as a single entity including the service server 710 and the cloud server 740 shown in FIG. 7.

Referring to FIG. 8, various data flows are performed in a plurality of layers in a smart adaptive alarm system (SAAS) except a server 810. Meanwhile, one or more digital devices may belong to each layer and data communication can be performed between the devices via the server 810 or a separate network.

A first layer includes a smart watch 812, a smartphone 814, a digital TV 816, and the like and directly performs data communication with the server 810. The first layer can perform a role of a controlling device in the smart adaptive alarm system (SAAS). For example, the digital devices 812/814/816 belonging to the first layer can upload personal information of a user using the digital device, sensor data sensed by various sensors near the device and the like to the server 810. The digital devices 812/814/816 belonging to the first layer can download data uploaded by various digital devices belonging to a home entity from the server 810.

A second layer mainly performs a display function. In particular, the second layer can perform data communication between a controlling device and a target device included in the smart adaptive alarm system (SAAS), register the controlling device and the target device, and output various UI/UX, OSD data and the like on various control selections and the like. In this case, digital devices belonging to the second layer may correspond to the digital devices belonging to the first layer.

In particular, the digital device belonging to the second layer can configure a smart weather service guide (SWSG) for using the smart adaptive alarm system (SAAS) and may be able to output the smart weather service guide (SWSG) on a screen. The smart weather service guide (SWSG) can be generated based on a smart weather service guide (SWSG) data downloaded from the server. Meanwhile, although it is explained as the smart weather service guide (SWSG) is generated at a configuration element of the second layer, by which the present invention may be non-limited. The smart weather service guide (SWSG) can also be generated at the first layer or the server.

Meanwhile, the smart weather service guide (SWSG) can include various data including total GUI, a GUI for a device to which the smart adaptive alarm system (SAAS) is currently applied, an operation result, recommendation for a next operating device, and the like.

A third layer corresponds to a target device. The third layer can include devices of an office or a parent's home such as a digital TV, LED lighting and the like. According to the present invention, various devices included in the smart adaptive alarm system (SAAS) can control power on/off, various functions, and the like based on the smart weather service guide (SWSG) and output a result of the control to a controlling device by returning the result from a corresponding device. Besides, although a device does not belong to such an entity as home or office, the device located within an AP (access point) range, a device such as a car located near the entity or a controlling device, and the like can also be controlled based on the smart adaptive alarm system (SAAS) and the smart weather service guide (SWSG).

A control command is transmitted and received between the second layer and the third layer and a processing result according to the control command can be returned. And, data on a current device, a list of functions performed by the device, a result of the function and the like can be outputted via the smart weather service guide (SWSG) between the second layer and the third layer. And, a next target device, a function control recommendation data for the target device, and the like can be outputted based on time information, sensing data and the like. Besides, if a controlling device is not detected within an AP range, relevant data is notified to the controlling device or a different controlling device within the AP range using a mobile communication network. When the data is notified, it may be able to perform a device or a function recommendation of the device.

In the following, for clarity, an example of providing the smart weather service guide (SWSG) by a digital TV is explained. And, in relation to the present invention, an example of providing a notification and the like by a mobile terminal is explained in the following. Yet, the present invention is not limited by the examples. Meanwhile, for clarity, the smart weather service guide (SWSG) is implemented in a form similar to a form of a legacy EPG to help understand the present invention.

FIGS. 9 to 11 illustrate diagrams for a smart weather service guide (SWSG) according to one embodiment of the present invention.

FIG. 9 is a diagram for a smart weather service guide (SWSG) in a unit of seven days.

Referring to FIG. 9, a smart weather service guide (SWSG) is implemented based on a horizontal axis corresponding to a date and a vertical axis corresponding to a weather data. The weather data includes data collected and revised by a weather server 712, a sensor at home, and the like. Referring to FIG. 9, temperature, humidity, precipitation (snow, rain, hail, etc.), fine dust, a special weather report and the like are shown as factors of the weather data. Yet, the factors of the weather data are not limited by the examples.

Meanwhile, the smart weather service guide (SWSG) in the unit of seven days can be provided based on a specific location or a place. FIG. 9 shows an example for a smart weather service guide (SWSG) for a room 1 at home. If a user accesses a 'Home/Room 1' item, it may be able to select a different location or a place. Then, a digital TV reconfigures the smart weather service guide (SWSG) according to the selected location or the place and may be able to provide the smart weather service guide (SWSG) in a form similar or identical to the form shown in FIG. 9.

In FIG. 9, if a specific item (e.g., a date item (July 1 (Mon)) 920 of the horizontal axis is selected, as shown in FIG. 10, the digital TV can configure and provide a smart weather service guide (SWSG).

Referring to FIG. 10, the digital TV configures and provides a smart weather service guide (SWSG) including weather data on various weather factors in a predetermined unit (e.g., a unit of 3 hours in FIG. 10) of a selected date item 920 according to a user action. In this case, if the user action of FIG. 9 corresponds to an action putting on an item of the horizontal axis, basically, a weather item itself of the vertical axis may not be changed. Yet, concrete values of each weather item may change according to a reference change of the horizontal axis.

Referring to FIG. 10, time information is changed to a time criteria from a day criteria according to the selection of the date item 920 shown in FIG. 9. As mentioned in the foregoing description, a predetermined time unit (i.e., a unit of 3 hours) is provided from AM 12:00 to PM 3:00 in FIG. 10. Yet, the time unit is not limited by the unit of 3 hours. The time unit may variously changes in a unit of hours, minutes, or seconds. Meanwhile, a first time unit item of the horizontal axis may correspond to a time unit to which current time belongs thereto. Hence, when the smart weather service guide is firstly provided, a time unit prior to the time unit to which the current time belongs can be excluded unless a past data is requested under an assumption that time goes by from the left to the right of the horizontal axis. In FIG. 10, 7 time items are depicted in a unit of 3 hours. In this case, each of the time items may change a size of the time item in a left/right direction. If the size is changed, sub items of a unit shorter than the unit of 3 hours can be provided. By doing so, it may be able to provide a weather data in more detail in response to the sub item.

Meanwhile, referring to FIG. 10, it may be able to provide an identifier 1010 to the top of the smart weather service guide (SWSG) to make a user identify a corresponding date (June 1). If a user accesses the identifier 1010, it may be able to change a day, enter the form shown in FIG. 9 again, or enter a further different menu.

Besides, referring to FIG. 10, it may also be able to provide values sensed by sensors located at home in response to the weather data as a smart weather service guide (SWSG) configured for a specific day.

Referring to FIG. 11, although a horizontal axis of a smart weather service guide (SWSG) is identical to that of the smart weather service guide (SWSG) shown in FIG. 9, a time item is provided on a vertical axis instead of the data item shown in FIG. 9. And, weather data of corresponding time of a corresponding date is provided to each internal item where the horizontal axis and the vertical axis intersect.

Figure 12:
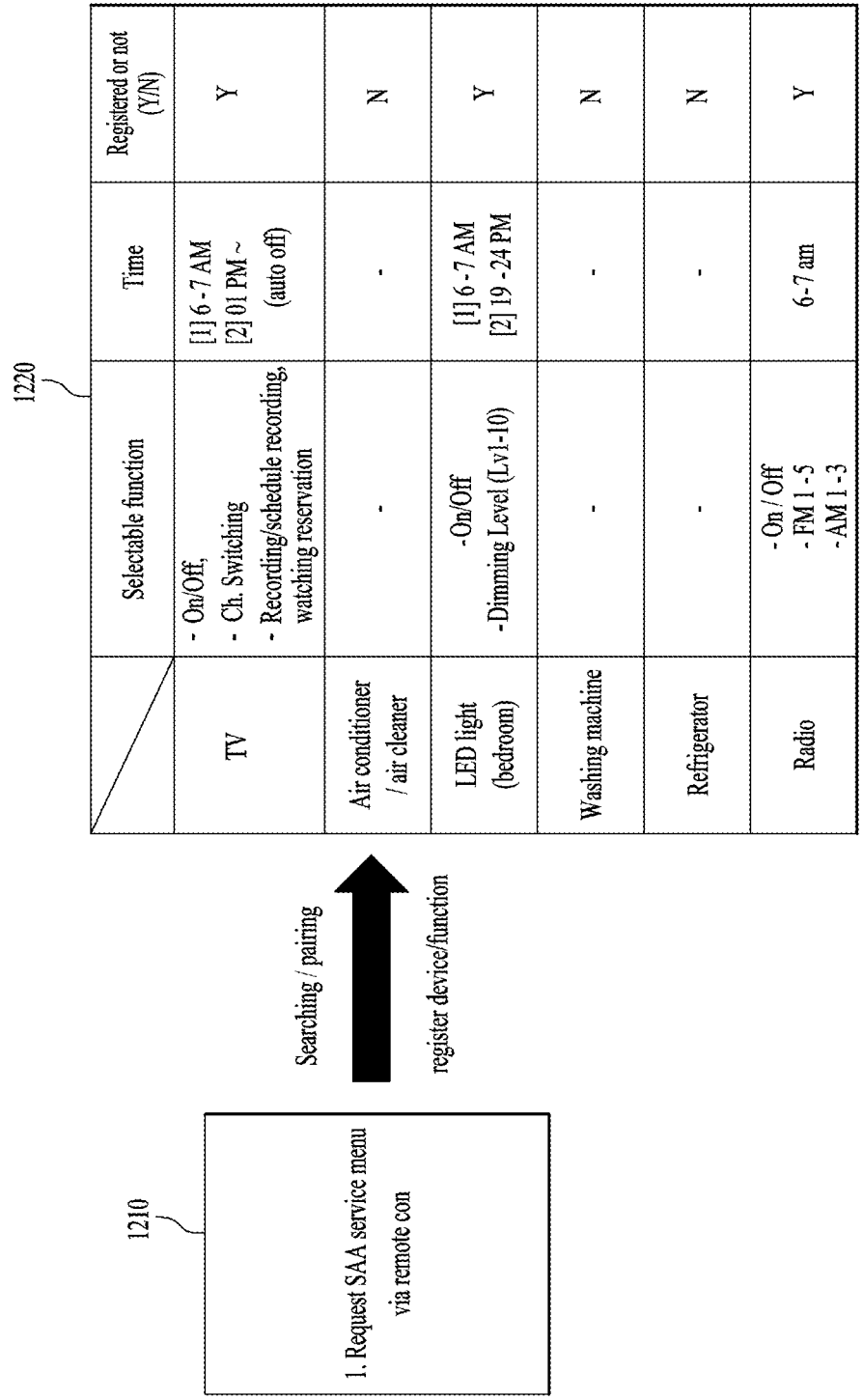
Figure 13:
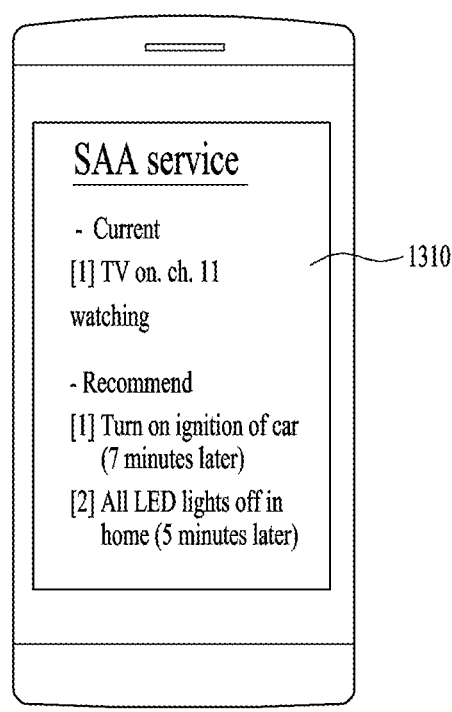

FIGS. 12 to 14 illustrate diagrams for a smart weather service guide (SWSG) according to a different embodiment of the present invention.

FIGS. 12 to 14 show a smart weather service guide (SWSG) of an aspect different from an aspect of the smart weather service guide shown in FIGS. 9 to 11.

In other word, unlike the smart weather service guide shown in FIGS. 9 to 11 configured by the day item and the weather item only, the smart weather service guide (SWSG) shown in FIGS. 12 to 14 is configured by adding a target device item to the smart weather service guide.

In order to configure the smart weather service guide (SWSG) including the target device items, as shown in FIG. 12, it may be able to perform a target device searching procedure, a registration procedure and the like.

Referring to FIG. 12, if a controlling device (i.e., a mobile terminal or a digital TV) makes a request for a service menu for a smart adaptive alarm system (SAAS), the digital TV searches for digital devices capable of being targeted near the digital TV and provides a list 1210 of searched digital device(s). In this case, the digital TV can be automatically paired with the searched digital device(s).

As shown in FIG. 12, the digital TV can provide the list 1210 of target devices by performing the searching/pairing procedure.

The list of the target devices shown in FIG. 12 includes information on a function selectable/usable by a user, information on time selectable/usable by a user, and information on whether or not the digital device is registered at the target device for each digital device to implement a smart adaptive alarm system (SAAS) in the digital device.

A user selects a specific item from the list 1210 of target devices shown in FIG. 12 and may be able to easily change a configuration, data, and the like of the selected item.

Meanwhile, the list 1210 of target devices shown in FIG. 12 provides an initial automatic recommendation item based on current time, a current weather data and the like and the initial automatic recommendation item can be randomly changed according to a selection of a user.

FIG. 12 shows the list 1210 of target devices for the smart adaptive alarm system (SAAS) in a digital TV, whereas FIG. 13 shows an example of a GUI 1310 for a smart adaptive alarm system (SAAS) in a mobile terminal.

In particular, since a size of a display is small due to a characteristic of a mobile terminal, the GUI 1310 can be differently configured compared to the digital TV shown in FIG. 12. For example, referring to FIG. 13, for a current smart adaptive alarm system (SAAS), it may be able to provide a status of a digital TV, an operation to be performed for the digital TV, a recommendation item for a configuration, and the like via the GUI 1310.

FIG. 14 illustrates a diagram of a smart weather service guide (SWSG) for a smart adaptive alarm system (SAAS) which is provided on a digital TV after selection of a target device, configuration, registration and the like are performed via the list 1210 of target devices shown in FIG. 12 or the GUI 1310 shown in FIG. 13.

Referring to FIG. 14, although a vertical axis is still configured by a day criteria, a horizontal axis is different from the configuration of the previous smart weather service guide (SWSG).

For example, a first horizontal axis 1410 is configured on the basis of a weather data and a second horizontal axis 1420 is configured on the basis of target devices.

Meanwhile, although it is depicted as the first horizontal axis 1410 is configured by a single row on the basis of current time, by which the present invention may be non-limited. The first horizontal axis can be configured by two or more rows.

The target devices of the second horizontal axis 1420 can be configured by devices which are registered as the target devices only in FIG. 12. Or, the target devices can include a searched and paired but not registered digital device(s) in consideration of a display size or a different factor. In this case, a not-registered digital device provided on the smart weather service guide (SWSG) can be immediately registered without accessing a separate GUI. Similarly, the second horizontal axis shown in FIG. 14 is provided in a manner of being listed up in terms of searching and pairing only irrespective of the registration procedure mentioned earlier in FIG. 12 and immediate registration and the like can be determined in a state of the smart weather service guide (SWSG) shown in FIG. 14.

FIGS. 15 to 24 illustrate diagrams for a smart weather service guide (SWSG) according to a further different embodiment of the present invention.

When a user makes a request for a smart adaptive alarm system (SAAS) via a controlling device, the aforementioned contents correspond to a method of configuring a smart weather service guide (SWSG) and firstly providing the smart weather service guide (SWSG), whereas the following description describes an additional control operation according to an access of the smart weather service guide (SWSG) after the smart weather service guide is firstly provided.

The smart weather service guide (SWSG) shown in FIG. 15 is identical to the smart weather service guide (SWSG) shown in FIG. 11. Yet, in FIG. 15, if an item 1510 indicating 16 to 18 P.M. is selected on June 1 (Mon) on the basis of a day, as shown in FIG. 16, a digital TV can provide a sub-smart weather service guide (sub-SWSG) 1610 on the previously provided main smart weather service guide (main-SWSG) in a manner of overlaying the main smart weather service guide with the sub-smart weather service guide as a different layer.

The sub-smart weather service guide (SWSG) 1610 provides a list of digital devices, information on whether power of each digital device is turned on/off, a current status or an operation state, information on whether a device is controlled automatically or manually, etc.

An item configured or changed on the sub-smart weather service guide (SWSG) 1610 can be processed by operation control reserved for a device on a day and time of an item selected in FIG. 15.

For example, if a specific day (June 1 (Mon)) is selected on the smart weather service guide shown in FIG. 14, FIG. 17 shows more detail data of the smart weather service guide (SWSG) in time unit on the selected day.

Referring to FIGS. 18 and 19, if a future day (e.g., June 2 (Tue)) is selected instead of a current day (June 1 (Mon)) on the smart weather service guide (SWSG) shown in FIG. 14, it may be able to provide a smart weather service guide (SWSG) shown in FIG. 19.

Meanwhile, referring to FIGS. 20 and 21, if a long-click is put on a day item 2010 (June 1 (Mon)) on the smart weather service guide (SWSG) shown in FIG. 14, as shown in FIG. 21, time items capable of being provided by the day item 2010 (June 1 (Mon)) can be provided between the day item 2010 and a day item 2020 (June 2 (Tue)) without converting a layer.

The aforementioned content is not limited to a case of putting a long-click on the day item (June 1 (Mon)). For example, if a boundary line between the day item 2010 (June 1 (Mon)) and the day item 2020 (June 2 (Tue)) is changed to the left/right, data of a time unit can be provided as much as a changed range of the boundary line on the basis of current time. For example, if the changed range is unable to output all time data of a corresponding date on the basis of the current time, the time data can be provided in a form capable of being scrolled.

The aforementioned content can be applied to all items instead of a day criteria or a time criteria. In other word, if a size change is performed on all items of a provided smart weather service guide (SWSG) according to a user selection, it may provide detail data in relation to a corresponding item or an adjacent item.

Referring to FIG. 21, 12-14 P.M. time item 2110 and 14-16 P.M. time item 2120 can be provided between a day item 2010 (June 1 (Mon)) and a day item 2020 (June 2 (Tue)) on the basis of current time (June 1 (Mon)). As mentioned in the foregoing description, it may be able to immediately access and check time items (not depicted) after 16 P.M. in a scrolling form without changing a layer.

Figure 22:
Figure 23:
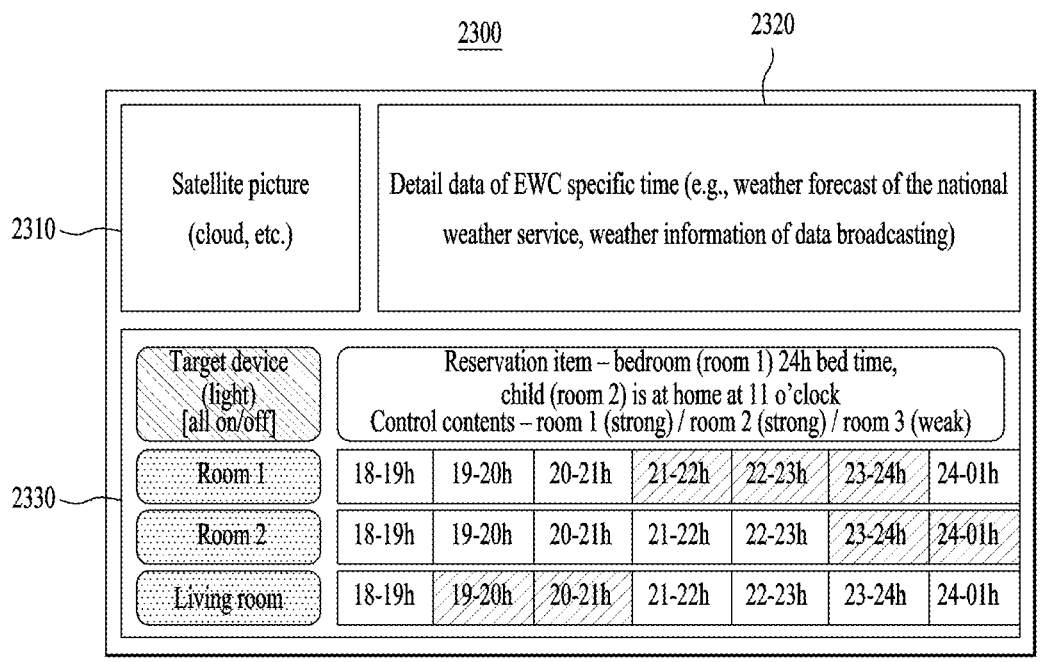

Meanwhile, as a different embodiment, referring to FIGS. 22 and 24, if an LED lighting item 2210 is selected on a provided smart weather service guide (SWSG), as shown in FIG. 23, a digital TV provides a sub-smart weather service guide (SWSG) 2300 as a separate screen. Or, as shown in FIG. 24, the digital TV can provide the sub-smart weather service guide (SWSG) 2300 with a different layer in a manner of overlaying the main-smart weather service guide (SWSG) shown in FIG. 22 with the sub-smart weather service guide (SWSG) 2300.

Referring to FIG. 23, the sub-smart weather service guide (SWSG) 2300 provides a GUI for performing detail configuration on a selected item.

Referring to FIG. 23, the sub-smart weather service guide (SWSG) 2300 can be configured by a first to third window.

In this case, the first window 2310 can provide a satellite picture for cloud and the like in relation to a weather data.

The second window 2320 provides detail weather data of current time. The detail weather data can include all data related to weather including weather forecast of the national weather service, weather information of data broadcasting, data sensed by sensors at home, a difference between the data, etc. If it is difficult to output all of the data within a window, the data can be provided in a form capable of being scrolled. Meanwhile, if the detail weather data provided in the second window 2320 corresponds to an item selected in FIG. 22 (e.g., a target device item), various data including a current status, a recommendation control and the like for the selected target device can be provided based on the weather data.

And, the third window 2330 can provide items for controlling a target device control in accordance with the target device. Referring to FIG. 23, if the target device corresponds to a light, it may be able to provide various data including an item for controlling power of LED light corresponding to the target device, an item for selecting a location or a place on which the LED light is mounted (room 1, room 2, living room, etc.), a current status of the LED light, a reservation configuration item, and the like. Meanwhile, the third window 2330 can also include a GUI capable of simply configuring power on/off time of the LED light in each location or place.

Figure 25:
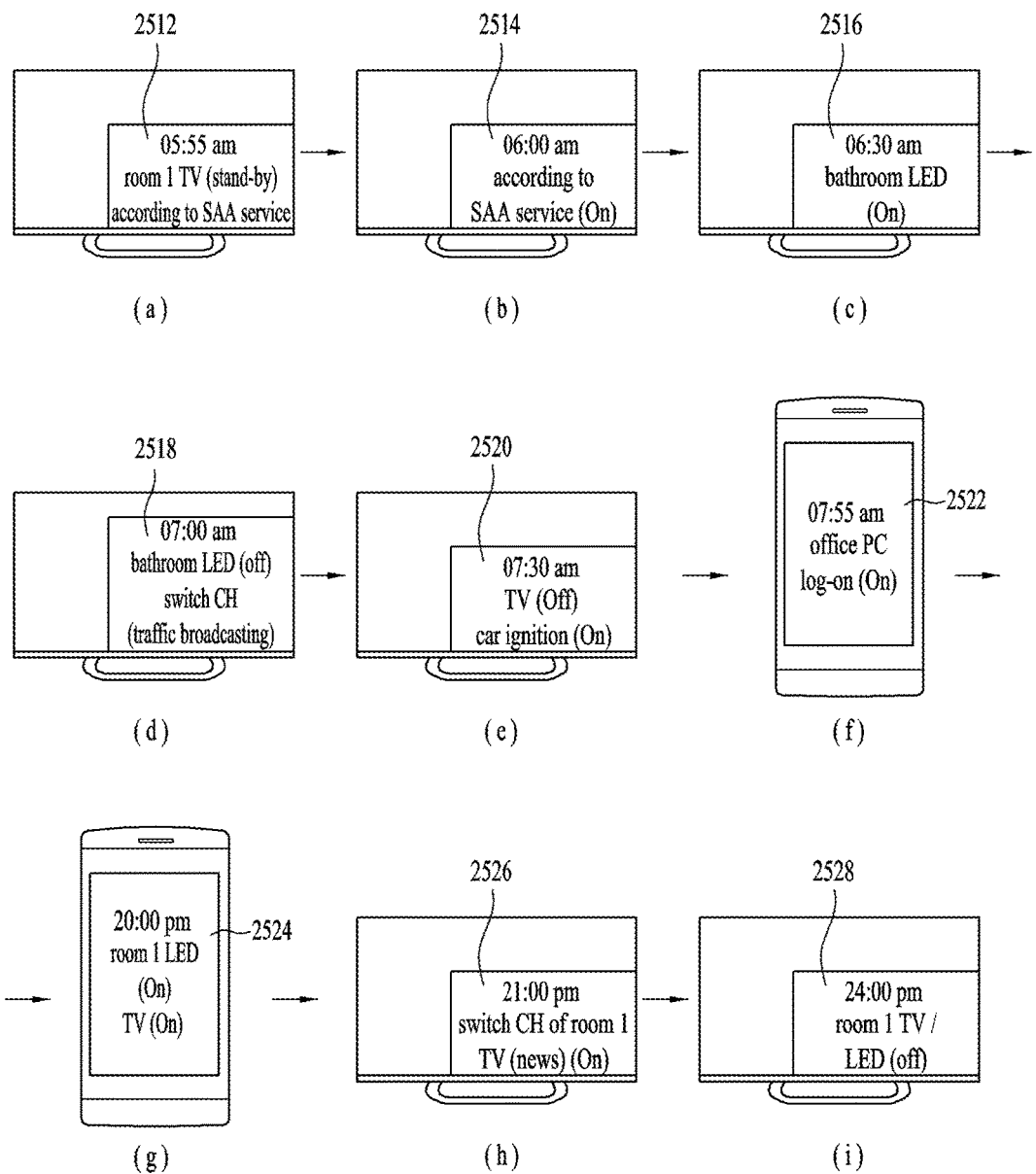
FIG. 25 illustrates a diagram for a service scenario using a smart weather service guide (SWSG) according to one embodiment of the present invention.

FIG. 25 illustrates a diagram for a service scenario using a smart weather service guide (SWSG) according to one embodiment of the present invention.

FIG. 25 shows an embodiment of performing a service scenario according to a smart adaptive alarm system (SAAS) in accordance with an item configured by a smart weather service guide (SWSG) at home.

Referring to FIG. 25a, if power of a digital TV is configured to be turned on at 6 A.M., the digital TV provides a GUI 2512 indicating that the digital TV of a room 1 is controlled in a standby state at 5:50 A.M. to turn on the power of the digital TV.

Referring to FIG. 25b, the digital TV provides a GUI 2514 indicating that the power of the digital TV of the room 1 is turned on at 6 A.M. and a channel 11 is tuned.

Referring to FIG. 25c, the digital TV provides a GUI 2516 indicating that power of a bathroom LED is automatically turned on at 6:30 A.M. according to a movement of a user after the power of the digital TV of the room 1 is turned on in FIG. 25b.

Referring to FIG. 25d, the digital TV provides a GUI 2518 indicating that the power of the bathroom LED is automatically turned off at 7 A.M. and the channel of the room 1 is switched to a channel providing traffic broadcasting for office attendance of a user.

Referring to FIG. 25e, since the user moves for a work, the digital TV provides a GUI 2520 indicating that the power of the TV of the room 1 is automatically turned off at 7:30 A.M. and ignition of a car is turned on in advance.

Referring to FIG. 25f, the GUI provided by the digital TV at home and smart home control are terminated. If the user arrives at the car of the user or an office of the user, a display of a mobile terminal provides a GUI 2522 indicating that an office PC is logged on in advance at 7:55 A.M.

Referring to FIG. 25g, if quitting time arrives after a smart office control of the office is terminated, the mobile terminal of the user or a display of the car provides a GUI 2524 indicating that the LED light of the room 1 is turned on and the power of the TV is also tuned on at 8 P.M.

Referring to FIG. 25h, the digital TV provides a GUI 2526 indicating that a channel is automatically switched to a predetermined news channel at 9 P.M. to enable the user to watch news based on a channel preferred by the user or personalized information.

Referring to FIG. 25i, the digital TV provides a GUI 2528 indicating that the TV of the room 1 and the LED light are turned off based on bed time configuration data of the user.

It may be able to configure to use the smart adaptive alarm system (SAAS) anywhere and at any time via a cloud server according to the aforementioned FIGS. 25a to 25i without being restricted to home or office according to a location or a movement of the user.

Meanwhile, although it is not depicted, the smart adaptive alarm system (SAAS) can be implemented based on schedule information of the user and the like with reference to a mobile terminal, e-mail, etc. of the user. And, it may recommend a smart weather service guide (SWSG) by automatically changing a configuration of the smart weather service guide (SWSG) to implement the smart adaptive alarm system (SAAS).

Besides, for example, it may be able to control a predetermined configuration of the smart weather service guide (SWSG) to be flexibly processed according to a moving line or a path of the user for a case that the user does not wake up at the wake-up time and other variable cases.

Figure 26:
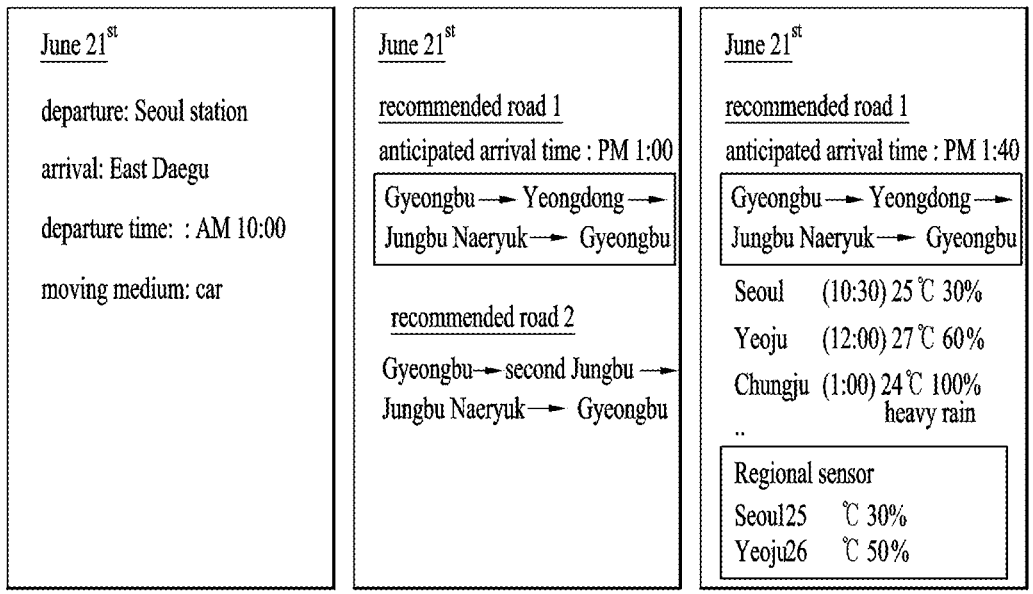
FIGS. 26 and 27 illustrate diagrams for a service scenario using a smart weather service guide (SWSG) according to a different embodiment of the present invention.
Figure 27:
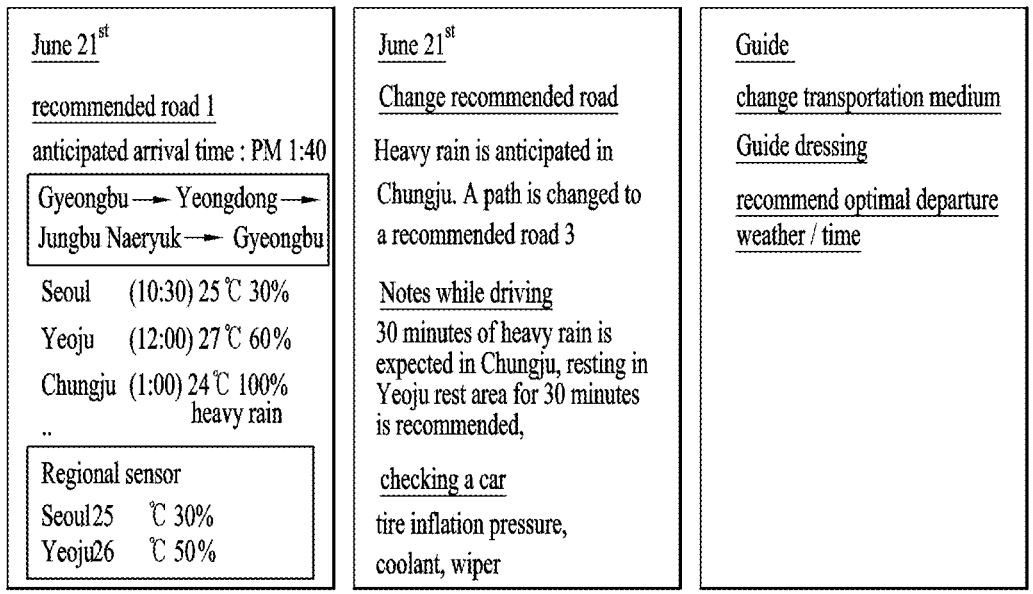

FIGS. 26 and 27 illustrate diagrams for a service scenario using a smart weather service guide (SWSG) according to a different embodiment of the present invention.

According to the present invention, as a different embodiment of the aforementioned smart weather service guide (SWSG), the smart weather service guide (SWSG) can be interlocked with a navigation.

Referring to FIG. 26a, if a user sets a departure location (Seoul station), an arrival location (East Daegu station), departure time (10 A.M.), a moving medium (car) and the like on a specific date via the smart weather service guide (SWSG), as shown in FIG. 26b or FIG. 26c, a digital TV or a mobile terminal can provide a GUI for a recommendation road for the smart adaptive alarm system (SAAS). In this case, the recommendation road GUI can be provided with reference to traffic information and weather information.

Referring to FIG. 26b, an item of a recommendation road 1 and an item of a recommendation road 2 provide anticipated arrival time and anticipated path information, respectively.

If one item (e.g., the item of the recommendation road 1) is selected from among the recommendation road items shown in FIG. 26b, a digital TV or a mobile terminal provides a GUI shown in FIG. 26c.

Referring to FIG. 26c, if the recommendation road 1 is selected, detail information is provided together with the anticipated arrival time and the anticipated path data provided in FIG. 26b. The detail information includes time of passing through a city related to the path and weather data on the city at the time of passing through the city. And, data sensed by sensors of the city can be provided at the bottom of the detail information. The sensed data may correspond to data sensed on the basis of current time.

Meanwhile, in order to make a user detour or avoid a specific city based on time and weather data of the city, as shown in FIG. 27b, it may be able to change a configuration. In this case, a path and anticipated arrival time can be provided again in a manner of being reconfigured according to the configuration change.

Or, if a user intends to change a configuration in FIG. 26c, as shown in FIG. 27c, a guide item is provided and change of a transportation medium, guide of dressing, optimal departure time, weather and the like can be automatically recommended.

Meanwhile, items configured in FIGS. 26 and 27 can be continuously updated according to a location change of a user and the items can be provided to a display of a digital device capable of being used by the user on the basis of occurrence of a change, a city, time or the like.

Meanwhile, various contents for a smart adaptive alarm system (SAAS) including various configurations related to the present invention, control, change and the like can be performed by a touch, voice, a gesture, eye-tracking or a combination thereof.

Hence, according to the aforementioned various embodiments of the present invention, it may be able to configure and provide a EWG (electronic weather guide) of a form similar to a form of an EPG (electronic program guide) or an SWSG (smart weather service guide) based on various information including weather, schedule and the like. It may be able to configure the SWSG based on data customized to a user according to a status of the user, a situation, an input and the like and provide a smart system customized to the user, i.e., a smart adaptive alarm system (SAAS). It may be able to manually or automatically control devices belonging to the smart adaptive alarm system (SAAS), which is connected via a network, based on the smart weather service guide (SWSG).

A digital device disclosed in the present specification and a method of processing data in the digital device may be non-limited to the aforementioned configurations and method of embodiments. The embodiments may be composed in a manner that a whole or a part of the each of the embodiments is selectively combined to achieve various modifications.

Meanwhile, a method of operating a digital device disclosed in the present specification can be implemented with a code readable by a processor in a recording media readable by the processor, which is equipped in the digital device. The recording media readable by the processor may include all kinds of recording devices for storing data capable of being read by the processor. The examples of the recording media readable by the processor may include a ROM (read only memory), a RAM (random access memory), a CD-ROM, a magnetic tape, a floppy disc, an optical data storing device and the like. And, implementing in a form of a carrier wave such as a transmission via an internet and the like is also included. The recording media readable by the processor are distributed to the computer systems connected by a network and codes readable by the processor can be stored and executed in a manner of being distributed.

While the present invention has been described and illustrated herein with reference to the preferred embodiments and diagrams thereof, the present invention may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

What is claimed is:

1. A method of processing data in a smart adaptive alarm system containing at least one controlling device and at least one target device, the method comprising:
   storing weather information, identification information of the controlling device, and sensing information of a sensor adjacent to the target device in a server;
   receiving a service guide display request in the controlling device;
   receiving the stored weather information, the identification information of the controlling device, and the sensing information of the sensor adjacent to the target device from the server in the controlling device;
   generating and displaying a service guide based on the received information in the controlling device;
   generating a control command for controlling the target device according to a configuration set from the displayed service guide in the controlling device;
   controlling the target device according to the generated control command; and
   displaying a control result of the target device by returning the result in the controlling device,
   wherein if a difference between the received weather information and the sensing information is equal to or greater than a predetermined threshold, a weather item of the service guide is updated based on the sensing information.

2. The method of claim 1, wherein the service guide is implemented in an EPG (Electronic Program Guide) form by containing at least two selected from the group consisting of a day item, the weather item, and a target device item.

3. The method of claim 2, wherein if a prescribed item is selected from the service guide, the controlling device generates a sub-service guide according to the selected item and displays the generated sub-service guide with a different layer to make the service guide is to be overlaid with the generated sub-service guide.

4. The method of claim 1, wherein if the target device is controlled based on configuration data of the service guide and the configuration data is sequentially configured, the sequentially configured data is automatically changed based on the controlling device or a movement of the controlling device.

5. The method of claim 1, wherein if a difference between the received weather information and the sensing information is equal to or greater than the predetermined threshold, the weather information and the sensing information are requested again.

6. The method of claim 5, wherein if the weather item is updated, a predetermined target device configuration data is updated based on data of the updated weather item and wherein a control command is transmitted in a manner of being regenerated based on the updated target device configuration data.

7. A method of processing data in a smart adaptive alarm system containing at least one controlling device and at least one target device, the method comprising:
   storing weather information, identification information of the controlling device, and sensing information of a sensor adjacent to the target device in a server;
   receiving a service guide display request in the controlling device;
   displaying a service guide in the controlling device;
   receiving an input of driving information in the controlling device;
   providing one or more recommendation paths in the controlling device based on the driving information and displaying anticipated time of the recommendation paths and weather data of the anticipated time by making a request for the anticipated time and the weather data to the server;
   displaying detail data and recommendation data on a specific path according to a user selection;
   generating and transmitting a control command for controlling the target device according to the detail data and the recommendation data on the displayed path; and displaying return data of the target device in the controlling device.

8. The method of claim 7, wherein the detail data and the recommendation data on the selected path are updated by making a request for data on the service guide to the server based on driving information of a user and wherein a control command is regenerated and displayed according to the updated data.

9. A smart adaptive alarm system comprising:
- a server configured to store weather information, identification information of a controlling device, and sensing information of a sensor adjacent to a target device;
- the controlling device configured to receive a service guide display request, to receive the stored weather information, the identification information of the controlling device, and the sensing information of the sensor adjacent to the target device from the server, to generate and display a service guide based on the received information, to generate a control command for controlling the target device according to a configuration set from the displayed service guide, and to display a control result of the target device by returning the result; and
- the target device configured to be controlled according to the control command and to return the control result,
- wherein if a difference between the received weather information and the sensing information is equal to or greater than a predetermined threshold, a weather item of the service guide is updated based on the sensing information.

10. The smart adaptive alarm system of claim 9, wherein the controlling device is configured to display the service guide in an EPG (Electronic Program Guide) form in a manner of containing at least two selected from the group consisting of a day item, the weather item, and a target device item.

11. The smart adaptive alarm system of claim 10, wherein if a prescribed item is selected from the service guide, the controlling device generates a sub-service guide according to the selected item and displays the generated sub-service guide with a different layer to make the service guide is to be overlaid with the generated sub-service guide.

12. The smart adaptive alarm system of claim 9, wherein, if the target device is controlled based on configuration data of the service guide and the configuration data is sequentially configured, the sequentially configured data is automatically changed based on the controlling device or a movement of the controlling device.

13. The smart adaptive alarm system of claim 9, wherein if a difference between the received weather information and the sensing information is equal to or greater than the predetermined threshold, the weather information and the sensing information are requested again.

14. The smart adaptive alarm system of claim 13, wherein, if the weather item is updated, predetermined target device configuration data is updated based on data of the updated weather item and wherein a control command is transmitted in a manner of being regenerated based on the updated target device configuration data.

15. A smart adaptive alarm system comprising:
- a server configured to store weather information, identification information of a controlling device, and sensing information of a sensor adjacent to a target device;
- the controlling device configured to display a service guide by configuring the service guide according to a service guide display request, to receive an input of driving information, to provide one or more recommendation paths based on the driving information, to display anticipated time of the recommendation paths and weather data of the anticipated time by making a request for the anticipated time and the weather data to the server, to display detail data and recommendation data on a specific path according to a user selection, to generate and transmit a control command for controlling the target device according to the detail data and the recommendation data on the displayed path; and
- the target device configured to operate according to the control command and to return a result of the operation to the controlling device.

16. The smart adaptive alarm system of claim 15, wherein the controlling device is configured to update the detail data and the recommendation data on the selected path by making a request for data on the service guide to the server based on driving information of a user and wherein the controlling device is configured to regenerate and display a control command according to the updated data.

* * * * *